(12) United States Patent
Kazakov

(10) Patent No.: US 10,572,399 B2
(45) Date of Patent: Feb. 25, 2020

(54) MEMORY REQUEST ARBITRATION

(71) Applicant: QUALCOMM Incorporated, San Diego, CA (US)

(72) Inventor: Maxim Kazakov, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 117 days.

(21) Appl. No.: 15/209,346

(22) Filed: Jul. 13, 2016

(65) Prior Publication Data
US 2018/0018097 A1 Jan. 18, 2018

(51) Int. Cl.
G06F 3/06 (2006.01)
G06F 13/16 (2006.01)
G06F 9/46 (2006.01)

(52) U.S. Cl.
CPC ........ G06F 13/1626 (2013.01); G06F 3/0659 (2013.01); G06F 3/0673 (2013.01); G06F 9/467 (2013.01); G06F 13/1663 (2013.01)

(58) Field of Classification Search
None
See application file for complete search history.

(56) References Cited

U.S. PATENT DOCUMENTS

| | | | |
|---|---|---|---|
| 7,406,554 B1 * | 7/2008 | Huffman | G06F 13/1642 710/112 |
| 7,571,284 B1 | 8/2009 | Olson et al. | |
| 7,796,137 B1 | 9/2010 | Mrazek et al. | |
| 8,180,975 B2 * | 5/2012 | Moscibroda | G06F 9/4881 711/105 |
| 8,607,234 B2 * | 12/2013 | Memik | G06F 9/3824 711/151 |
| 8,886,886 B2 | 11/2014 | Biswas et al. | |
| 8,972,995 B2 | 3/2015 | Srinivasan et al. | |
| 2003/0074519 A1 | 4/2003 | Weber | |
| 2010/0174840 A1 * | 7/2010 | Blainey | G06F 13/1605 710/121 |

(Continued)

OTHER PUBLICATIONS

Khronos OpenCL Working Group, "The OpenCL Specification: Version 1.2," Document Revision 19, Editor: Aaftab Munishi, Nov. 14, 2012, 380 pp.

(Continued)

*Primary Examiner* — Lewis A Bullock, Jr.
*Assistant Examiner* — Bruce S Ashley
(74) *Attorney, Agent, or Firm* — Shumaker & Sieffert, P.A.

(57) ABSTRACT

In an example, a method of arbitrating memory requests may include tagging a first batch of memory requests with first metadata identifying that the first batch of memory requests originates from a first group of threads. The method may include tagging a second batch of memory requests with second metadata identifying that the second batch of memory requests originates from the first group of threads. The method may include storing the first and second batches of memory requests in a conflict arbitration queue. The method may include performing, using the first metadata and the second metadata, conflict arbitration between only the first batch of memory of requests and the second batch of memory requests stored in the conflict arbitration queue, which may include at least one other batch of memory requests stored that originates from a group of threads different from the first group of threads stored therein.

26 Claims, 9 Drawing Sheets

(56) References Cited

U.S. PATENT DOCUMENTS

2011/0302586 A1 12/2011 Chung
2013/0297906 A1 11/2013 Loh et al.
2015/0293785 A1 10/2015 Murphy

OTHER PUBLICATIONS

Khronos OpenCL Working Group, "The OpenCL Specification: Version 2.0," Document Revision 33, Editors: Aaftab Munishi, Lee Howes, and Bartosz Sochacki, Apr. 13, 2016, 205 pp.
Khronos Group, "The OpenGL ES Shading Lanugage: Version 3.20," Document Revision 3, Editor: Robert J. Simpson, OpenGL GLSL Editor: John Kennenich, GLSL version 1.1 Authors: John Kennenich, Dave Baldwin, and Randi Rost, Jan. 29, 2016, 229 pp.
International Search Report and Written Opinion from international application PCT/US2017/033818, dated Aug. 9, 2017, 11 pages.
International Preliminary Report on Patentability from International Application No. PCT/US2017/033818, dated Jan. 24, 2019, 9 pp.

\* cited by examiner

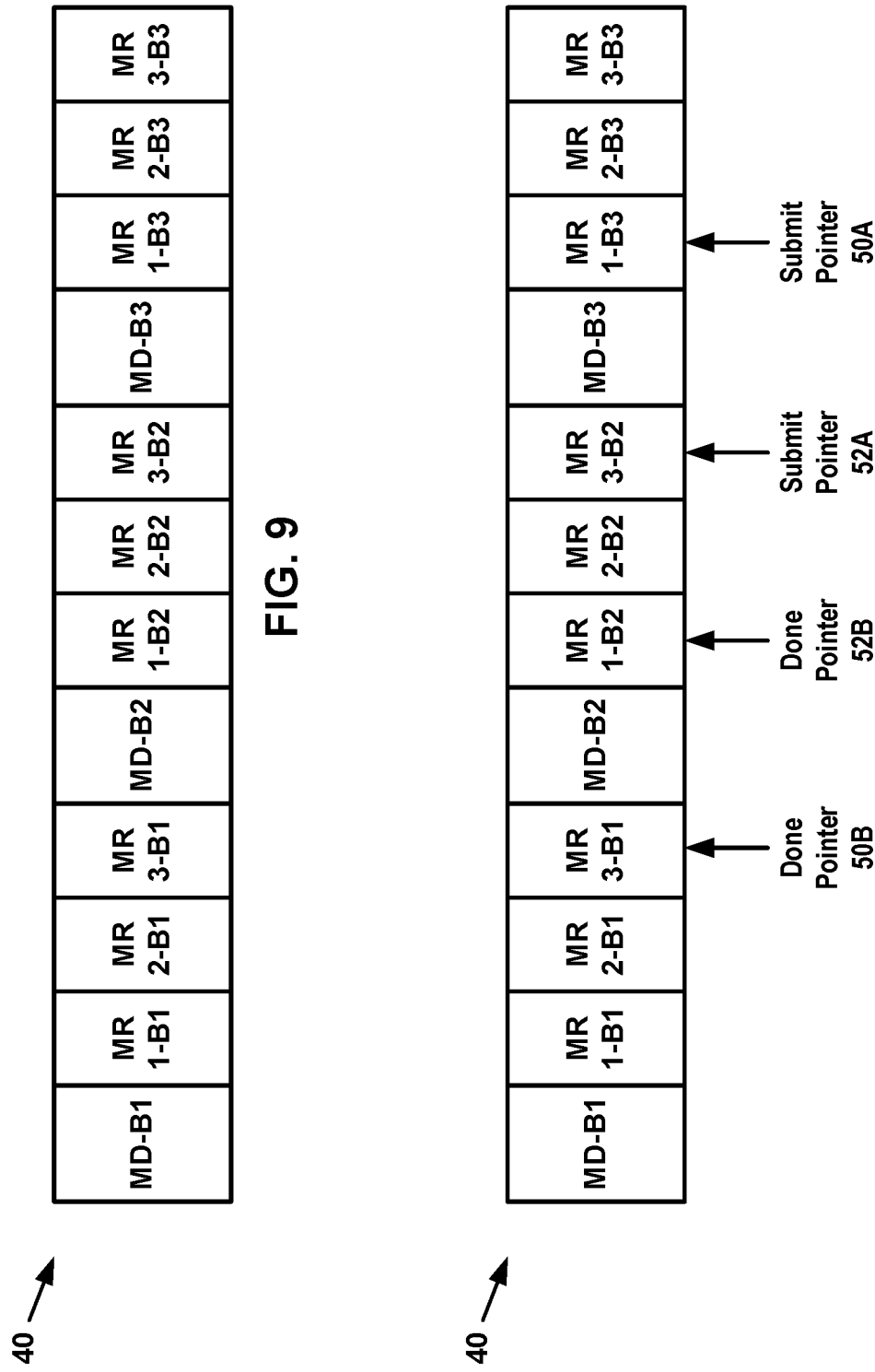

MEMORY REQUEST ARBITRATION

TECHNICAL FIELD

The disclosure relates to arbitrating memory requests.

BACKGROUND

Processing units, such as CPUs and GPUs, may be configured to process a group of threads in parallel. One or more threads in each group of threads may, upon execution by a processing unit, generate a memory request, such as a read request or a write request. Memory requests may be grouped into batches of memory requests.

SUMMARY

In general, this disclosure describes techniques for arbitrating memory requests.

In one example, this disclosure describes a method comprising generating, by a processing unit, batches of memory requests, wherein each batch of memory requests respectively originates from execution of a respective group of threads; tagging, by the processing unit, a first batch of memory requests of the batches of memory requests with first metadata, wherein the first metadata includes data identifying a group of threads from which the first batch of memory requests originates, wherein the group of threads from which the first batch of memory requests originates is a first group of threads; tagging, by the processing unit, a second batch of memory requests of the batches of memory requests with second metadata, wherein the second metadata includes data identifying a group of threads from which the second batch of memory requests originates, wherein the group of threads from which the second batch of memory requests originates is the first group of threads; storing, before sending any memory request of the first batch of memory requests to a first memory or a memory controller, the first batch of memory requests and the first metadata in a conflict arbitration queue; storing, before sending any memory request of the second batch of memory requests to the first memory or the memory controller, the second batch of memory requests and the second metadata in the conflict arbitration queue; and performing, using the first metadata and the second metadata, conflict arbitration between only the first batch of memory of requests and the second batch of memory requests stored in the conflict arbitration queue, wherein at least one other batch of memory requests stored in the conflict arbitration queue originates from at least one group of threads different from the first group of threads.

In another example, this disclosure describes a device comprising a first memory; a memory controller communicably coupled to the first memory; and a processing unit communicably coupled to at least one of the first memory or the memory controller, wherein the processing unit is configured to: generate batches of memory requests, wherein each batch of memory requests respectively originates from execution of a respective group of threads; tag a first batch of memory requests of the batches of memory requests with first metadata, wherein the first metadata includes data identifying a group of threads from which the first batch of memory requests originates, wherein the group of threads from which the first batch of memory requests originates is a first group of threads; tag a second batch of memory requests of the batches of memory requests with second metadata, wherein the second metadata includes data identifying a group of threads from which the second batch of memory requests originates, wherein the group of threads from which the second batch of memory requests originates is the first group of threads; store, before sending any memory request of the first batch of memory requests to the first memory or the memory controller, the first batch of memory requests and the first metadata in a conflict arbitration queue; store, before sending any memory request of the second batch of memory requests to the first memory or the memory controller, the second batch of memory requests and the second metadata in the conflict arbitration queue; and performing, using the first metadata and the second metadata, conflict arbitration between only the first batch of memory of requests and the second batch of memory requests stored in the conflict arbitration queue, wherein at least one other batch of memory requests stored in the conflict arbitration queue originates from at least one group of threads different from the first group of threads.

In another example, this disclosure describes an apparatus comprising means for generating batches of memory requests, wherein each batch of memory requests respectively originates from execution of a respective group of threads; means for tagging a first batch of memory requests of the batches of memory requests with first metadata, wherein the first metadata includes data identifying a group of threads from which the first batch of memory requests originates, wherein the group of threads from which the first batch of memory requests originates is a first group of threads; means for tagging a second batch of memory requests of the batches of memory requests with second metadata, wherein the second metadata includes data identifying a group of threads from which the second batch of memory requests originates, wherein the group of threads from which the second batch of memory requests originates is the first group of threads; means for storing, before sending any memory request of the first batch of memory requests to a first memory or a memory controller, the first batch of memory requests and the first metadata in a conflict arbitration queue; means for storing, before sending any memory request of the second batch of memory requests to the first memory or the memory controller, the second batch of memory requests and the second metadata in the conflict arbitration queue; and means for performing, using the first metadata and the second metadata, conflict arbitration between only the first batch of memory of requests and the second batch of memory requests stored in the conflict arbitration queue, wherein at least one other batch of memory requests stored in the conflict arbitration queue originates from at least one group of threads different from the first group of threads.

In another example, this disclosure describes a non-transitory computer-readable storage medium having instructions stored thereon that, when executed, cause one or more processing units to: generate batches of memory requests, wherein each batch of memory requests respectively originates from execution of a respective group of threads; tag a first batch of memory requests of the batches of memory requests with first metadata, wherein the first metadata includes data identifying a group of threads from which the first batch of memory requests originates, wherein the group of threads from which the first batch of memory requests originates is a first group of threads; tag a second batch of memory requests of the batches of memory requests with second metadata, wherein the second metadata includes data identifying a group of threads from which the second batch of memory requests originates, wherein the group of threads from which the second batch of memory requests originates is the first group of threads; store, before sending any memory request of the first batch of memory requests to a first memory or a memory controller, the first batch of memory requests and the first metadata in a conflict arbitration queue; store, before sending any memory request of the second batch of memory requests to the first memory or the memory controller, the second batch of memory requests and the second metadata in the conflict arbitration queue; and perform, using the first metadata and the second metadata, conflict arbitration between only the first batch of memory of requests and the second batch of memory requests stored in the conflict arbitration queue, wherein at least one other batch of memory requests stored in the conflict arbitration queue originates from at least one group of threads different from the first group of threads.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 9 illustrates an example of performing conflict arbitration.

FIG. 10 illustrates an example of performing conflict arbitration.

DETAILED DESCRIPTION

Figure 1:
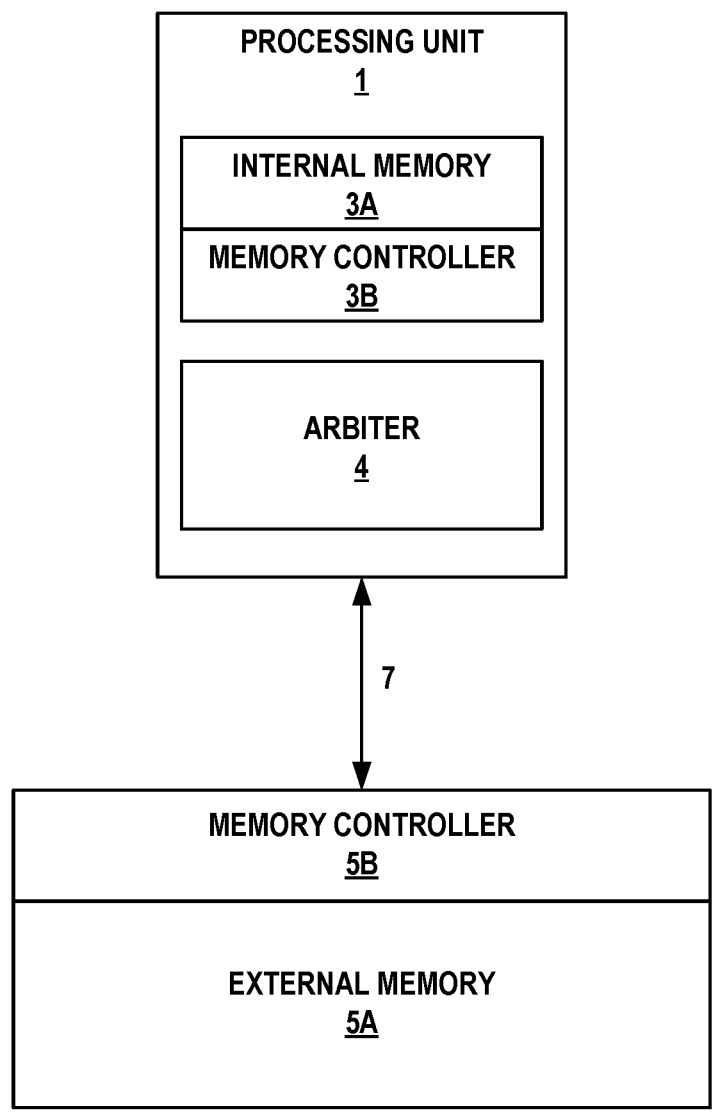
FIG. 1 is a block diagram illustrating a computing device that may be configured to implement the techniques of this disclosure.

In general, this disclosure describes one or more techniques for arbitrating memory requests. One or more techniques described herein may suppress memory request reordering when there is a conflict (e.g., actual or potential); and, as such, may ensure that is safe (e.g., there is no conflict) to perform memory request reordering. It is understood that reference to there being no conflict may not mean that there is absolutely no conflict. Rather, there being no conflict may refer to there being no conflict that is to be resolved by a processing unit configured to perform the techniques for arbitrating memory requests described herein. For example, a processing unit performing the techniques for arbitrating memory requests described herein may determine that there is no conflict between batches of memory requests because a known conflict between the two batches may be resolved by a memory subsystem (e.g., a memory controller) in the chain of processing. One or more techniques described herein may increase memory request execution parallelism and memory latency hiding, thereby providing a performance boost. For example, one or more techniques described herein enable more memory requests to be in flight to a memory or a memory controller by exploiting the absence of inter-group (e.g., inter-wave) and inter-thread dependencies according to APIs (e.g., GPU APIs). As used herein, memory requests "in flight" may, in some examples, refer to memory requests currently in transit to a memory and/or a memory controller, memory requests received by a memory and/or a memory controller, memory requests being serviced by a memory and/or a memory controller, memory requests queued for service by a memory and/or a memory controller, or any combination thereof.

One or more techniques described herein may simplify or eliminate conflict checking hardware corresponding to a memory by removing the need to check for conflicts across all memory requests in a hazard checking window. Instead, one or more techniques described herein may leverage the absence of inter-group (e.g., inter-wave) and inter-thread dependencies by checking for conflicts only among memory requests originating from the same thread group (e.g., wave). By removing unnecessary conflict checks, the techniques described herein are scalable with massively parallel processing systems. For example, by removing unnecessary conflict checks, the techniques described herein are scalable for conflict arbitration (e.g., hazard checking) in GPUs with hundreds to thousands of memory requests in flight.

In some examples, as used herein, the term "thread" may refer to a single operation or instruction. The operation or instruction may be fixed or programmable. In other examples, as used herein, the term "thread" may refer to multiple operations or instructions. For example, the term "thread" may refer to a sequence of operations or instructions. The sequence of operations or instructions may be fixed or programmable. It is therefore understood that there may, in some examples, be different thread types (e.g., fixed or programmable) originating from different parts of processing unit 1; and, as such, processing unit 1 may generate memory requests from different thread types (e.g., a fix or programmable thread type).

FIG. 1 is a block diagram illustrating an example processing unit that may be configured to implement one or more techniques of this disclosure. As shown in FIG. 1, processing unit 1 may include internal memory 3A. Access to internal memory 3A may be controlled by a memory controller 3B. Memory controller 3B may be any memory controller, such as a Direct Memory Access (DMA) controller or any other memory controller. Memory external to processing unit 1, such as depicted external memory 5A, may be accessible to processing unit 1. In some examples, external memory 5A may be system memory. Access to external memory 5A may be controlled by a memory controller 5B. Memory controller 5B may be any memory controller, such as a Direct Memory Access (DMA) controller. A memory controller (e.g., memory controller 3B and/or memory controller 5B) may include one or more memory request buffers to temporarily store received memory requests while the memory controller services other memory requests. A memory controller may be configured to arbitrate the order in which memory requests access the memory (or memories) with which the memory controller is associated. The example described with respect to FIG. 1 may include other components in addition to the components illustrated in the example of FIG. 1.

Processing unit 1 may be configured to generate memory requests (e.g., read memory requests, write memory requests, and any other type of memory request). Processing unit 1 may include a memory request arbiter 4, which may also be referred to herein as arbiter 4. Arbiter 4 may be or include one or more of the following elements of processing unit 1: processors (e.g., one or more microprocessors), one or more application specific integrated circuits (ASICs), one or more field programmable gate arrays (FPGAs), one or more arithmetic logic units (ALUs), one or more digital signal processors (DSPs), discrete logic, software, hardware, firmware, or other equivalent integrated or discrete logic circuitry. For example, it is understood that reference to arbiter 4 may include reference to processing unit 1 because processing unit 1 provides the functionality of arbiter 4. As one example, arbiter 4 is described below as including a queue, which may be referred to as a conflict arbitration queue, for holding memory requests. However, with the understanding that reference to arbiter 4 may include reference to processing unit 1, it is thus understood that this description with respect to arbiter may apply to processing unit 1 at a higher level such that this description may be interpreted to also mean that processing unit 1 may include the queue, which may be referred to as a conflict arbitration queue, for holding memory requests.

Arbiter 4 may include a queue, which may be referred to as a conflict arbitration queue, for holding memory requests. With the understanding that reference to arbiter 4 may include reference to processing unit 1, it is thus understood that this description may be interpreted to mean that processing unit 1 may include the queue, which may be referred to as a conflict arbitration queue, for holding memory requests.

Arbiter 4 may process memory requests stored in the queue in sequence or in parallel. With the understanding that reference to arbiter 4 may include reference to processing unit 1, it is thus understood that this description may be interpreted to mean that processing unit 1 may process memory requests stored in the queue in sequence or in parallel. The memory requests may correspond to batches of memory requests. For example, the queue may be configured to hold (e.g., store) memory requests corresponding to multiple batches of memory requests. As another example, the queue may be configured to hold (e.g., store) memory requests corresponding to N or more batches of memory requests, where N is a positive integer.

Arbiter 4 may be configured to release memory requests from the queue. With the understanding that reference to arbiter 4 may include reference to processing unit 1, it is thus understood that this description may be interpreted to mean that processing unit 1 may be configured to release memory requests from the queue. Upon being released from the queue of arbiter 4, processing unit 1 may be configured to send or otherwise transmit the released memory requests to memory (e.g., internal memory 3A and/or external memory 5A). As used herein, reference to "memory" may refer to internal memory 3A, external memory 5A, and/or any other memory accessible by processing unit 1. For example, processing unit 1 may be configured to address memory requests so that the memory requests are sent to and received by a memory controller corresponding to the memory associated with the memory requests. Accordingly, while processing unit 1 may be described herein as being configured to send memory requests to memory, it is understood that the memory requests sent may be received by a memory controller that arbitrates memory requests for the memory. The memory requests may, in some examples, be addressed such that they are transmitted over a communication medium (e.g., bus 7) and received by the addressed component (e.g., a memory controller). In other examples, the memory requests may be addressed such that they are destined for a memory but are nonetheless received by a memory controller.

Processing unit 1 may be configured to tag memory requests and/or batches of memory requests with metadata. In some examples, tagging the memory requests with metadata may occur at the time each memory request is generated. Similarly tagging batches of memory requests with metadata may, in some examples, occur at the time each batch is generated. In some examples, the tagged metadata may identify the thread group from which the particular memory request tagged with the metadata originated. In other examples, the tagged metadata may identify the thread group from which the batch of memory requests tagged with the metadata originated. In such examples, the batch of memory requests itself may be tagged or only the first memory request in the batch of memory requests may be tagged with the metadata. By tagging the batch of memory requests or only the first memory request in the batch of memory requests, processing unit 1 may be configured to reduce the consumption of bandwidth by not tagging each memory request in a batch of memory requests with the metadata. It is understood that reference to tagging a batch of memory requests with metadata is not to be interpreted as tagging each memory request of the batch of memory requests with the metadata. Instead, tagging a batch of memory requests with metadata is understood to mean tagging the batch itself (e.g., adding metadata before the first memory request of the batch, adding metadata after the last memory request of the batch, or adding metadata to an encapsulation data structure corresponding to the batch) or tagging a single memory request in the batch (e.g., the first memory request in the batch). Tagging the batch itself may include, for example, adding metadata to an encapsulation data structure. In another example, tagging the batch itself may include inserting a batch identifier between memory requests originating from different thread groups. A batch identifier, such as a batch start identifier described herein which may also be referred to as a batch delimiter token, may be inserted before the first memory request of each batch of memory requests. In other examples, may be inserted after the last memory request of each batch of memory requests. In such examples, inserting a batch identifier at the front and/or at the end of each batch of memory requests may serve to delimit the batches of memory requests when stored in a conflict arbitration queue because when stored in sequence, the batch identifier (with the exception of the first and/or last batch in such a queue) is positioned between two batches of memory requests. A batch identifier may serve to separate batches from different thread groups and/or clients.

The batch of memory requests may be delimited by, for example, a batch identifier, such as a start batch identifier described herein or a batch delimiter token. The batch identifier may be stored in the conflict arbitration queue.

Processing unit 1, arbiter 4 of processing unit 1, batches of memory requests, tagging of metadata, and the metadata itself will be described in more detail below.

Processing unit 1 may be communicatively coupled to external memory 5A over a communication medium, whether wired or wireless. In some examples, processing unit 1 may be directly communicatively coupled to external memory 5A via a communication medium such as bus 7. In other examples, processing unit 1 may be indirectly communicatively coupled to external memory 5A via a communication medium such as a bus. In such other examples, processing unit 1 may be directly communicatively coupled to another component (e.g., a different processing unit), which is itself directly communicatively coupled to external memory 5A via a communication medium such as a bus.

In some examples, internal memory 3A may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media, any on-chip memory (e.g., any integrated memory of processing unit 1), or any other internal memory. In other examples, internal memory 3A may include one or more memories or storage devices different than the examples described above.

External memory 5A may comprise one or more computer-readable storage media. External memory 5A may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, SDRAM DDR SDRAM, a magnetic data media or an optical storage media, any off-chip memory (e.g., any memory external to processing unit 1), any other memory, or any other medium that can be used to store one or more instructions and/or data structures and that can be accessed by a processing unit (e.g., processing unit 1).

External memory 5A may be a non-transitory storage medium according to some examples. The term "non-transitory" may indicate that the storage medium is not embodied in a carrier wave or a propagated signal. In some examples, the term "non-transitory" may mean that external memory 5A is non-movable. In other examples, the term "non-transitory" does not mean that external memory 5A is non-movable or that its contents are static. As one example, external memory 5A may be removed from a computing device (e.g., computing device 2 described with respect to FIG. 2) with which it is communicatively coupled. For example, external memory 5A may be communicatively decoupled (e.g., wirelessly, physically, or otherwise) from a computing device, and be communicatively coupled (e.g., wirelessly, physically, or otherwise) to another computing device (e.g., computing device 2 described with respect to FIG. 2). As another example, external memory 5A may be removed or otherwise physically disconnected from a computing device with which it is communicatively coupled and moved to another device (e.g., move to and be physically connected to another device). As another example, external memory 5A may be physically inserted into another device. In certain examples, a non-transitory storage medium may store data that can, over time, change (e.g., in RAM).

In some examples, external memory 5A may include instructions (e.g., may have instructions stored thereon) that, when executed, cause processing unit 1 to perform the functions ascribed to processing unit 1 in this disclosure. Accordingly, external memory 5A may be a computer-readable storage medium having instructions stored thereon that, when executed, cause one or more processors (e.g., processing unit 1) to perform one or more functions described herein.

Processing unit 1 may be a central processing unit (CPU), a graphics processing unit (GPU), a parallel processing unit (e.g., any processing unit configured to perform parallel processing), a system on chip (SoC), or any other processing unit that may be configured to perform one or more techniques described herein. In some examples, processing unit 1 may be a GPU with general purpose processing capabilities, and may be referred to as a general purpose GPU (GPGPU) when implementing general purpose processing tasks (e.g., non-graphics related tasks). Accordingly, as used herein, reference to a GPU may mean a GPU with or without general purpose processing capabilities. In some examples, processing unit 1 may be a single instruction multiple data (SIMD) processor, a multiple instruction multiple data (MIMD) processor, a single program multiple data (SPMD) processor, or a multiple program multiple data (MPMD) processor.

Processing unit 1 may include one or more processors (e.g., one or more microprocessors), one or more application specific integrated circuits (ASICs), one or more field programmable gate arrays (FPGAs), one or more arithmetic logic units (ALUs), one or more digital signal processors (DSPs), discrete logic, software, hardware, firmware, other equivalent integrated or discrete logic circuitry, or any combination(s) thereof. Processing unit 1 may also include one or more processor cores, so that processing unit 1 may be referred to as a multi-core processor. In some examples, processing unit 1 may be specialized hardware that includes integrated and/or discrete logic circuitry that provides processing unit 1 with massive parallel processing capabilities suitable for parallel processing, such as graphics processing. The techniques of this disclosure apply to any processing unit that may be configured to perform memory request arbitration.

It is understood that any benefits corresponding to the techniques described herein may increase as the parallel processing capability of processing unit 1 increases. For example, a GPU is generally considered to have massively parallel processing capabilities whereas a CPU is considered to have parallel processing capabilities but not necessarily in the massive sense, particularly when compared to a GPU. Accordingly, in such examples where an exemplary GPU has massively parallel processing capabilities and an exemplary CPU has parallel processing capabilities less than that of the exemplary GPU, it is understood that any benefits accruing from the techniques described herein may be recognized by both such processing units, except any benefits realized by the exemplary GPU may be greater than that of the exemplary CPU due to the exemplary GPU having more parallel processing capabilities. However, it is also understood that industry is fluid and that some CPUs may be designed such that they have more parallel processing capabilities than that of a GPU. In such examples, it is understood that any advantage(s) corresponding to the one or more techniques described herein may be recognized by such massively parallel CPUs as well as GPUs, except any advantage(s) realized by these particular exemplary CPUs may be greater than that of the exemplary GPU due to the exemplary CPUs having more parallel processing capabilities than the exemplary GPU. It is thus understood that any advantage(s) corresponding to the one or more techniques described herein may be realized by any processing unit having parallel processing capabilities.

It is understood that, unlike a typical CPU, a GPU may generate hundreds to thousands of memory requests from a single instruction (e.g., from a single SIMD instruction). In this regard, it is understood that the techniques described herein may be generally more beneficial to a processing unit having the capability of generating hundreds to thousands of memory requests in parallel when compared to processing unit not having the capability of generating hundreds to thousands of memory requests in parallel. For example, out-of-order execution of memory requests may boost performance, and in some examples, significantly so. For example, out-of-order execution may enable many memory requests in flight to hide memory latency. However, as the number of generated memory requests increases, so too does the processing required to enable out-of-order execution if out-of-order execution is enabled by determining whether the address of each individual memory request does or does not conflict with the address of another individual memory request to ensure memory consistency. For example, comparing the addresses of each generated memory request may not be feasible and/or may not scale well as the number generated requests increases. Accordingly, the techniques described herein may enable an efficient and scalable way of identifying non-conflicting and/or conflicting memory among memory requests. For example, the techniques described herein may enable an efficient and scalable way of extracting non-conflicting and/or independent memory among memory requests.

One or more techniques described herein may be implemented in hardware, software, firmware, or any combination thereof. For example, where one or more techniques described herein are implemented in hardware, processing unit 1 may be such hardware or one component of a plurality of hardware components configured to operate together to perform one or more techniques described herein. In such examples, the hardware may or may not be configured to execute software or firmware that may perform one or more techniques described herein when executed. Any software and/or firmware may be stored on a non-transitory storage medium, such as on-chip memory of hardware (e.g., internal memory 3A of processing unit 1) or on external memory to any hardware (e.g., external memory 5A).

Figure 2:
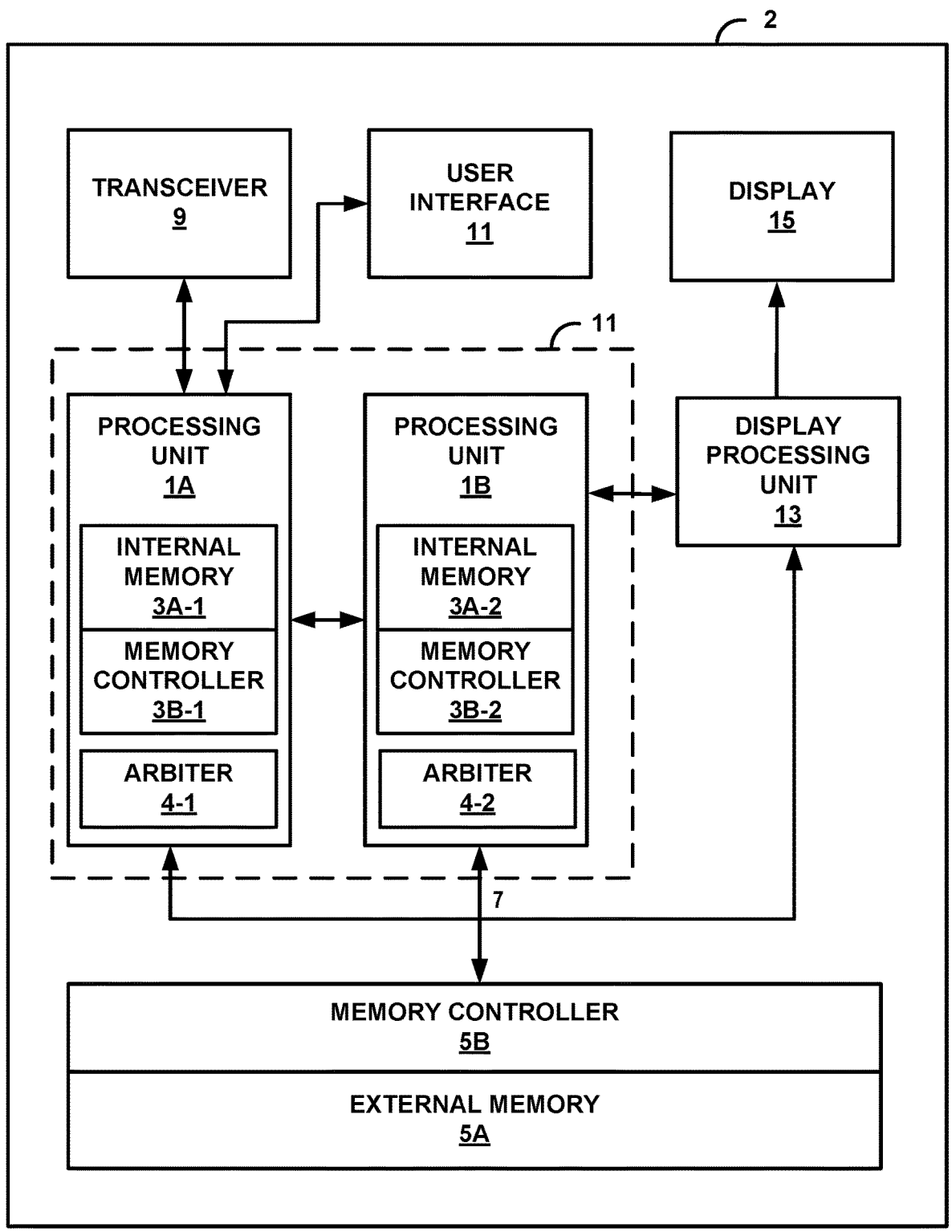
FIG. 2 illustrates the one or more processing units shown in FIG. 1 that may be configured to implement the techniques of this disclosure in greater detail.

FIG. 2 is a block diagram illustrating an example computing device (e.g., computing device 2) and a processing unit (e.g., processing unit 1) that may be configured to implement one or more aspects of this disclosure. As shown in FIG. 2, computing device 2 may be, for example, a personal computer, a desktop computer, a laptop computer, a tablet computer, a computer workstation, a video game platform or console, a mobile telephone (e.g., a cellular or satellite telephone), a handheld device (e.g., a portable video game device or a personal digital assistant (PDA)), a wearable computing device, a personal music player, a video player, a display device, a television, a network device, an intermediate network device, any computing device, or any other type of device that may be configured to implement one or more aspects of this disclosure.

Computing device 2 may include one or more processing units 1, transceiver 9, user interface 11, display processing unit 13, display 15, and external memory 5A. In the example of FIG. 1, computing device is shown as including two processing units: processing unit 1A and processing unit 1B. As used herein, reference to processing unit 1 may refer to one or more processing units, e.g., processing unit 1A and/or processing unit 1B. For example, reference to processing unit 1 may refer to processing unit 1A. As another example, reference to processing unit 1 may refer to processing unit 1B. As another example, reference to processing unit 1 may refer to processing unit 1A and/or processing unit 1B. As yet another example, reference to processing unit 1 may refer to one or more processing units 1. Processing unit 1 may or may not be configured to perform heterogeneously with other processing units. For example, processing unit 1A and processing unit 1B may be configured to perform heterogeneously with one another. It is therefore understood that computing device 2 may be configured to perform heterogeneous computing. Processing unit 1 may be integrated into any computing device. In some examples, processing unit 1A may be a CPU, and processing unit 1B may be a GPU. In other examples, processing unit 1B may be a CPU, and processing unit 1A may be a GPU.

Processing unit 1A may include internal memory 3A-1. Access to internal memory 3A-1 may be controlled by a memory controller 3B-1. Memory controller 3B-1 may be any memory controller, such as a Direct Memory Access (DMA) controller or any other memory controller. Similarly, processing unit 1B may include internal memory 3A-2. Access to internal memory 3A-2 may be controlled by a memory controller 3B-2. Memory controller 3B-2 may be any memory controller, such as a Direct Memory Access (DMA) controller or any other memory controller. As used herein, reference to internal memory 3A may refer to internal memory 3A-1 and/or internal memory 3A-2. For example, reference to internal memory 3A may refer to internal memory 3A-1. As another example, reference to internal memory 3A may refer to internal memory 3A-2. As another example, reference to internal memory 3A may refer to internal memory 3A-1 and/or internal memory 3A-2. Similarly as used herein, reference to memory controller 3B may refer to memory controller 3B-1 and/or memory controller 3B-2. For example, reference to memory controller 3B may refer to memory controller 3B-1. As another example, reference to memory controller 3B may refer to memory controller 3B-2. As another example, reference to memory controller 3B may refer to memory controller 3B-1 and/or memory controller 3B-2.

Internal memory 3A-1 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media, any on-chip memory (e.g., any integrated memory of processing unit 1A), or any other internal memory. In other examples, internal memory 3A-1 may include one or more memories or storage devices different than the examples described above. Similarly, internal memory 3A-2 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media, any on-chip memory (e.g., any integrated memory of processing unit 1B), or any other internal memory. In other examples, internal memory 3A-2 may include one or more memories or storage devices different than the examples described above.

Processing unit 1A may include a memory request arbiter 4-1, which is referred to herein as arbiter 4-1. Arbiter 4-1 may include a queue for holding memory requests. The description with respect to arbiter 4 applies to arbiter 4-1. Processing unit 1B may include a memory request arbiter 4-2, which is referred to herein as arbiter 4-2. Arbiter 4-2 may include a queue for holding memory requests. The description with respect to arbiter 4 applies to arbiter 4-2. Accordingly, as used herein, reference to arbiter 4 may refer to arbiter 4-1 and/or arbiter 4-2. For example, reference to arbiter 4 may refer to arbiter 4-1. As another example, reference to arbiter 4 may refer to arbiter 4-2. As another example, reference to arbiter 4 may refer to arbiter 4-1 and/or arbiter 4-2.

Memory external to processing unit 1A and processing unit 1B, such as depicted external memory 5A, may be accessible to processing unit 1A and/or processing unit 1B. In some examples, external memory 5A may be system memory. Access to external memory 5A may be controlled by a memory controller 5B. Memory controller 5B may be any memory controller, such as a Direct Memory Access (DMA) controller. A memory controller (e.g., memory controller 3B-1, memory controller 3B-2, and/or memory controller 5B) may include one or more memory request buffers to temporarily store received memory requests while the memory controller services other memory requests. A memory controller may be configured to arbitrate the order in which memory requests access the memory (or memories) with which the memory controller is associated.

The various components, shown in computing device 2 in the example of FIG. 2 may not be necessary in every example of computing device 2. For example, computing device 2 may, in other examples, may not include one or more components shown in the example of FIG. 2 (e.g., display processing unit 13). In other examples, computing device 2 may include one or more components in addition to the components illustrated in the example of FIG. 2.

Transceiver 9 may include circuitry to allow wireless or wired communication between computing device 2 and another device or a network. Transceiver 9 may include modulators, demodulators, amplifiers and other such circuitry for wired or wireless communication. In some examples, transceiver 9 may or may not be integrated with processing unit 1. For example, transceiver 9 may be part of the same integrated circuit (IC) as processing unit 1, may be external to the IC or ICs that may include part or all of processing unit 1, or may be formed in an IC that is external to the IC or ICs that may include part or all of processing unit 1. For example, transceiver 9 may be implemented as any of a variety of suitable encoder circuitry, such as one or more microprocessors, digital signal processors (DSPs), application specific integrated circuits (ASICs), field programmable gate arrays (FPGAs), arithmetic logic units (ALUs), discrete logic, software, hardware, firmware or any combinations thereof.

Examples of user interface 11 may include, but are not limited to, a trackball, a mouse, a keyboard, and any other input device. For example, user interface 11 may include a touch screen, which may be incorporated as part of display 15. Display 15 may comprise a liquid crystal display (LCD), a cathode ray tube (CRT) display, a plasma display, a touch-sensitive display, a presence-sensitive display, or any other type of display. In examples where user interface 11 is partially or fully implemented using software (e.g., a graphical user interface), the software may be executed by processing unit 1 or a processing unit different from processing unit 1, and the software may be stored on a memory (e.g., on-chip memory such as internal memory 3A or off-chip memory such as external memory 5A). Processing unit 1 may be configured to access and execute the software instructions stored on the memory to implement one or more aspects of user interface 11.

Display processing unit 13 may or may not utilize a tile-based architecture. In some examples, a tile is an area representation of pixels comprising a height and width with the height being one or more pixels and the width being one or more pixels. In such examples, tiles may be rectangular or square in nature. In other examples, a tile may be a shape different than a square or a rectangle. Display processing unit 13 may be configured to fetch multiple image layers (e.g., foreground and background) from at least one memory. For example, display processing unit 13 may be configured to fetch image layers from a frame buffer to which a processing unit (e.g., processing unit 1, such as processing unit 1B in some examples) outputs graphical data in the form of pixel representations and/or other memory. The multiple image layers may include foreground layers and/or background layers. As used herein, the term "image" is not intended to mean only a still image. Rather, an image or image layer may be associated with a still image (e.g., the image or image layers when blended may be the image) or a video (e.g., the image or image layers when blended may be a single image in a sequence of images that when viewed in sequence create a moving picture or video).

Display processing unit 13 may be configured to process pixels from multiple layers. Example pixel processing that may be performed by display processing unit 13 may include up-sampling, down-sampling, scaling, rotation, and/or other pixel processing. For example, display processing unit 13 may be configured to process pixels associated with foreground image layers and/or background image layers. Display processing unit 13 may be configured to blend pixels from multiple layers, and write back the blended pixels into memory in tile format. Then, the blended pixels may be read from memory in raster format and sent to display 15 for presentment.

Referring now to processing unit 1, processing unit 1 may be configured to execute various types of applications. Instructions for execution of the one or more applications may be stored within a memory accessible by processing unit 1 (e.g., internal memory 3A and/or external memory 5A). Processing unit 1 may be configured to transmit and/or receive one or more processing tasks from another processing unit. For example, processing unit 1A (e.g., a CPU) may be configured to offload one or more processing tasks to processing unit 1B (e.g., a GPU). As another example, processing unit 1B (e.g., a GPU) may be configured to offload one or more processing tasks to processing unit 1A (e.g., a CPU).

Processing unit 1 may be configured to perform one or more processes in accordance with a computing platform (e.g., a framework for parallel programming) that may include a programming language, an application program interface (API), libraries, and/or a runtime system. In other examples, a computing platform may refer to a computing standard and/or computing specification. For example, processing unit 1 may be configured to perform one or more processes in accordance with the OpenCL computing platform using the OpenCL API. Aspects of this disclosure are not limited to the OpenCL computing platform and/or the OpenCL APIs. For example, processing unit 1 may be configured to perform one or more processes in accordance with any parallel computing platform, any heterogeneous computing platform, and the like. For example, processing unit 1 may be configured to perform one or more processes in accordance with the OpenGL computing platform, the CUDA computing platform, the HSA Foundation computing platform, the Vulkan API, and the like. Additionally, the techniques described in this disclosure are not required to function in accordance with an API.

Figure 3:
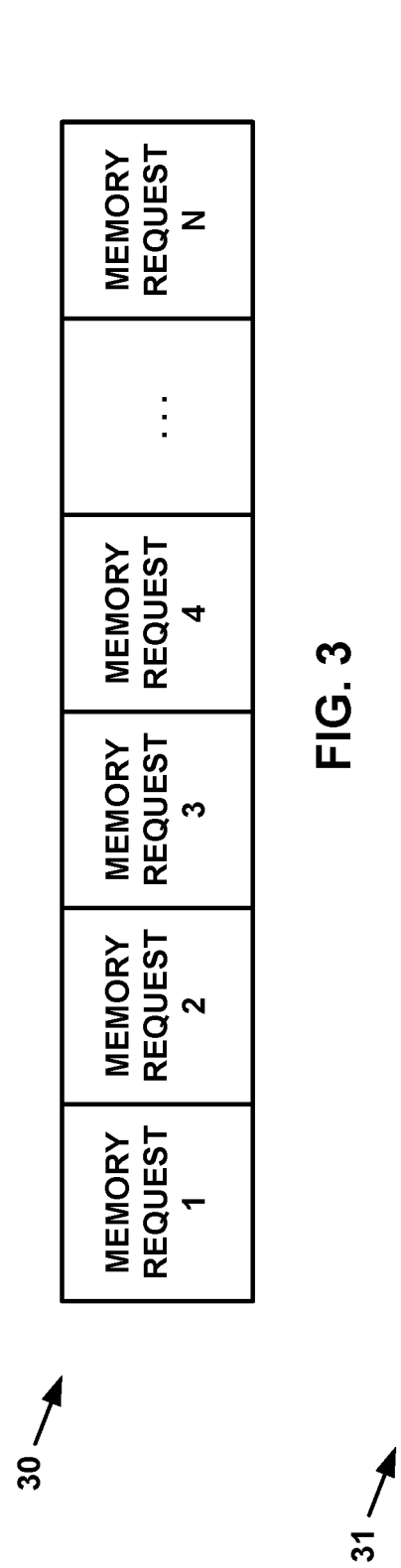
FIG. 3 illustrates one example of a batch of memory requests.

FIG. 3 illustrates one example of a batch of memory requests 30. A batch of memory requests, such as the batch of memory requests 30, may include multiple, individual memory requests. Each memory of request in a batch of memory requests may only be of the same type. For example, the batch of memory requests 30 may include a plurality of read memory requests. In another example, the batch of memory requests 30 may include a plurality of write memory requests. However, the batch of memory requests 30 cannot include more than one type of memory request. For example, the batch of memory requests 30 cannot include a read memory request and a write memory request. In the example shown, memory request N refers to the Nth numbered memory request of the batch of memory requests 30, where N is a positive integer.

Processing unit 1 may be configured to process a plurality of thread groups in parallel. As used herein, a thread group may also be referred to as a group of threads, a wave, a warp, a workgroup, or the like. A thread group may include a plurality of threads. In some examples, the plurality of threads corresponding to a thread group may be generated from a single instruction, such as a single SIMD instruction. In some examples, a thread group may include 32 threads. In other examples, a thread group may include more than or less than 32 threads. For example, a thread group may include 8 threads, 16 threads, 64 threads, or any other number of threads less than or equal to 32.

Processing unit 1 may be configured to execute a plurality of thread groups in parallel. For example, processing unit 1 may be configured to execute a first thread group in parallel with one or more other threads groups. In such an example, processing unit 1 may be configured to execute a plurality of threads corresponding to the first thread group in parallel with one or more other threads corresponding to the one or more other thread groups. For example, processing unit 1 may be configured to execute a plurality of threads corresponding to the first thread group and a plurality of threads corresponding to a second thread group.

One or more threads corresponding to each thread group may, upon execution by processing unit 1, result in the generation of a request, such as a memory request (e.g., read or write) or a fence (e.g., barrier) request. For example, processing unit 1 may generate a memory request in response to executing a thread. As another example, a group of 32 threads may generate, upon execution, up to 32 memory requests. The 32 memory requests in this example may include a plurality of read requests and a plurality of write requests.

Processing unit 1 may be configured to group memory requests into batches of memory requests. As used herein the term "batch" refers to a batch of memory requests. For example, reference to a first batch refers to a first batch of memory requests and reference to a second batch refers to a second batch of memory requests. Processing unit 1 may be configured to generate the batches of memory requests based on the thread group from which a memory request originated and based on the request type of the memory request. For example, as described above, processing unit 1 may be configured to execute a plurality of thread groups, each thread group generating one or more memory requests. Processing unit 1 may be configured to generate one or more batches of memory requests corresponding to each thread group, meaning that each batch of memory requests only includes memory requests originating from the same thread group.

In some examples, a batch may be formed by all active threads in a thread group executing, for example, a memory request instruction (e.g., a single SIMID memory request instruction but parallelized using the threads of the thread group). In some examples, processing unit 1 may be configured to reduce number of memory requests in a batch compared to the number of active threads in a thread group as it finds duplicated or overlapped memory requests in batch. In such examples, processing unit 1 may be configured to generate less memory requests relative to the number of threads in a thread group. As such, processing unit 1 maybe configured to generate and/or store a batch of memory requests having less memory requests relative to the number of threads in the thread group from which the memory requests originate. By reducing the number of memory requests and/or the size of a batch of memory requests in this way, less memory space in a conflict arbitration queue is necessary to accommodate to store the memory requests. Accordingly, in some examples, there may or may not be a one-to-one correspondence between batch size and number of (active) threads in an issuing thread group, where an issued thread groups refers to the group of threads from which the memory requests originate.

A batch of memory requests only includes a single type of memory request. For example, a batch of read memory requests only includes read memory requests, and a batch of write memory requests only includes write memory requests. Accordingly, from a plurality of read memory requests originating from execution of a group of threads and from a plurality of write memory requests originating from execution of the same group of threads, processing unit 1 may be configured to generate one or more batches of read memory requests and one or more batches of write memory requests.

For example, a first group of 32 threads may generate one or more read memory requests and/or one or more write memory requests, and a second group of 32 threads may generate one or more read memory requests and/or one or more write memory requests. In such an example, the first group of 32 threads may generate a plurality of read requests and a plurality of write requests, and the second group of 32 threads may generate a plurality of read requests and a plurality of write requests. Processing unit 1 may, in this example, be configured to generate at least one batch of memory requests corresponding to the plurality of read memory requests of the first group of threads and at least one batch of memory requests corresponding to the plurality of write memory requests of the first group of threads. Similarly, processing unit 1 may be configured to generate at least one batch of memory requests corresponding to the plurality of read memory requests of the second group of threads and at least one batch of memory requests corresponding to the plurality of write memory requests of the second group of threads.

Figure 4:
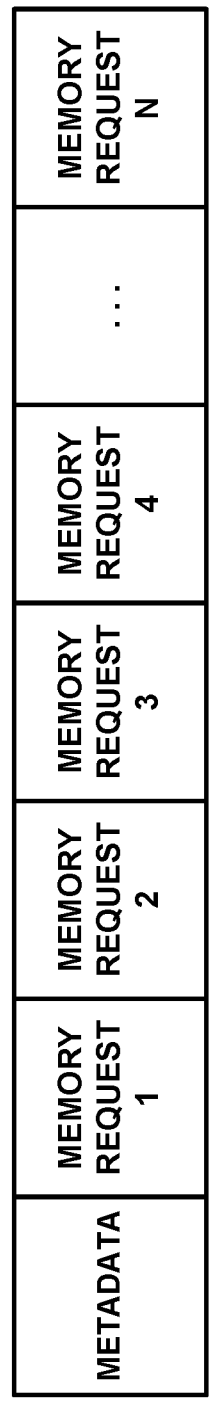
FIG. 4 illustrates an example of tagging a batch of memory requests with metadata.

Processing unit 1 may be configured to tag memory requests and/or batches of memory requests with metadata. For example, FIG. 4 illustrates one example in which processing unit 1 may be configured to tag a batch of memory requests (e.g., batch of memory requests 31) with metadata. In some examples, tagging the batch itself with metadata may include, as shown in the example of FIG. 4, adding metadata to the beginning of the batch of memory requests (e.g., before, such as in front of, the first memory request of the batch). In other examples, tagging the batch itself with metadata may include adding metadata to the end of the batch of memory requests (e.g., after the last memory request of the batch). In other examples, the metadata may be added to one or more fields in a header corresponding to the batch of memory requests. For example, the metadata may be added to one or more fields in a header corresponding to an encapsulated data structure of the batch of memory requests. In the example of FIG. 4, the metadata is added (e.g., tagged) to the batch before the first memory request in the batch.

Figure 5:
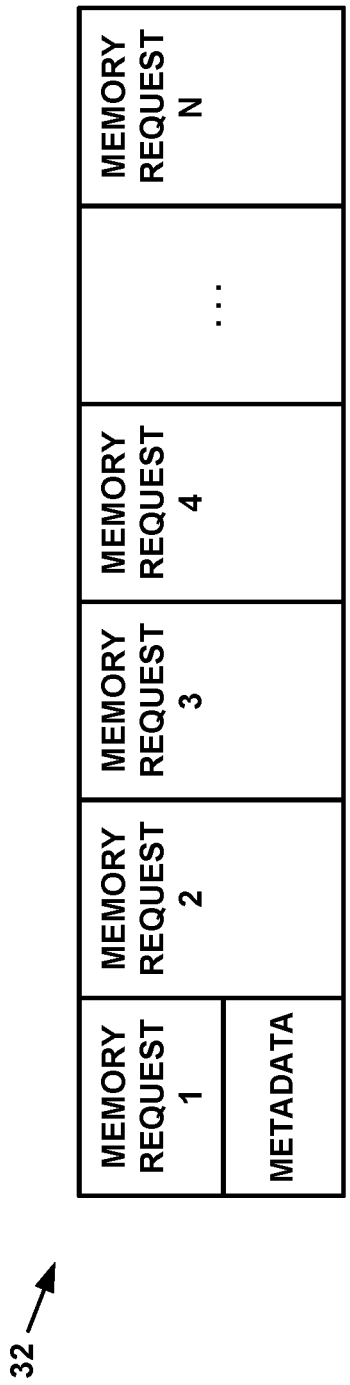
FIG. 5 illustrates an example of tagging a batch of memory requests with metadata.

FIG. 5 illustrates another example in which processing unit 1 may be configured to tag a batch of memory requests (e.g., batch of memory requests 32) with metadata. In some examples, tagging the batch itself with metadata may include, as shown in the example of FIG. 5, tagging only the first memory request in the batch of memory requests (e.g., memory request 1 shown in FIG. 5) with the metadata. In some examples, the metadata may be added to the beginning of the first memory request in the batch of memory requests. For example, the metadata may be added to one or more fields in a header corresponding to the first memory request.

Figure 6:
FIG. 6 illustrates an example of tagging each memory request of a batch of memory requests with metadata.

FIG. 6 illustrates an example in which processing unit 1 may be configured to tag each memory request in a batch of memory requests (e.g., batch of memory requests 33) with metadata. In some examples, the metadata may be added to the beginning of each memory request in the batch of memory requests. For example, the metadata may be added to one or more fields in a header corresponding to each memory request. While metadata is depicted as "metadata" for each memory request depicted in FIG. 6, it is understood that the metadata tagged to each memory request may or may not be the same. For example, the metadata tagged to each memory request may include a thread group identifier, which is discussed in more detail below. However, the metadata tagged to the first memory request of the batch of memory requests (e.g., memory request 1) may also include a batch start identifier while the metadata tagged to subsequent memory requests (e.g., memory requests subsequent to the first memory request in the same batch) may not include a batch start identifier. The batch start identifier may precede the thread identifier in the conflict arbitration queue (e.g., when stored therein) and serve as a batch delimiter. In other examples, the last memory request of the batch of memory requests may include a batch start identifier while the metadata tagged to previous memory requests (e.g., memory requests previous to the last memory request in the same batch) may not include a batch start identifier. The batch start identifier may be tagged to the last memory request of the batch such that the batch start identifier is positioned after the last memory request when stored in the conflict arbitration queue and serve as a batch delimiter.

A batch start identifier is discussed in more detail below. In other examples, the thread group identifier may serve two purposes: one purpose being to identify the group of threads from which the memory requests following the metadata originate, and the second purpose being to identify the start of a new batch of memory requests. In such examples, a batch start identifier may not be included within the metadata because arbiter 4 is configured to determine two things with the thread group identifier. The examples in which the thread group identifier may serve two purposes may include the examples described, for example, with respect to FIGS. 4 and 5. In some examples, metadata may only include a thread group identifier.

In some examples, processing unit 1 may be configured to tag metadata to a batch of memory requests or one or more memory requests as described herein upon processing unit 1 generating the batch of memory requests. For example, processing unit 1 may be configured to tag metadata to a batch of memory requests or one or more memory requests as described herein upon grouping one or more memory requests into a batch.

Processing unit 1 may be configured to store batches of memory requests in a conflict arbitration queue 40. For example, arbiter 4 of processing unit 1 may be configured to receive a batch of memory requests 30 that is tagged with metadata (e.g., in the manner described with respect to FIG. 4 or FIG. 5). As another example, arbiter 4 of processing unit 1 may be configured to receive a batch of memory requests 30, where each memory request of the batch of memory requests is tagged with metadata (e.g., in the manner described with respect to FIG. 6). Arbiter 4 may be configured to store the received batch of memory requests in a queue 40, which may be referred to as conflict arbitration queue 40.

In some examples, processing unit 1 (e.g., arbiter 4) may be configured to store batches of memory requests in a conflict arbitration queue in the order in which the batches are issued. In other examples, processing unit 1 (e.g., arbiter 4) may be configured to store batches of memory requests in a conflict arbitration queue in an order different from the order in which the batches are issued. In such examples, processing unit 1 may be configured to reorder the batches based on a pre-conflict arbitration queue policy. In other examples, processing unit 1 may be configured to control the order in which batches of memory requests are stored in a conflict arbitration queue by being configured to arbitrate the order in which thread groups are allowed to execute. In such examples, processing unit 1 may be configured to store the batches of memory requests in a conflict arbitration queue in the order in which the batches are issued.

Figure 7:
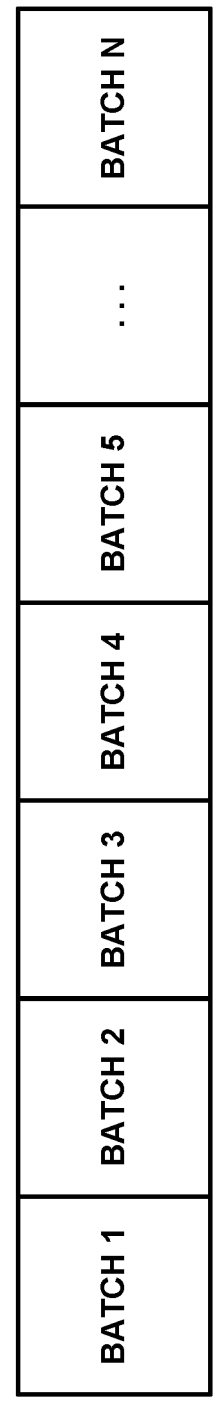
FIG. 7 illustrates an example of a conflict arbitration queue.

Conflict arbitration queue 40 may be configured to hold batches of memory requests. For example, FIG. 7 illustrates one example of conflict arbitration queue 40 in which batches of memory requests 1 through N are stored in the queue, where N represents the Nth batch of memory requests and N is a positive integer. In one example, batch of memory requests 30 described with respect to any of FIGS. 4-6 may constitute one of the batches of memory requests illustrated in FIG. 7 and/or FIG. 8. In another example, the format of batch of memory requests 30 described with respect to any of FIGS. 4-6 may constitute the format in which metadata is tagged for the batches of memory requests illustrated in FIG. 7 and/or FIG. 8.

Figure 8:
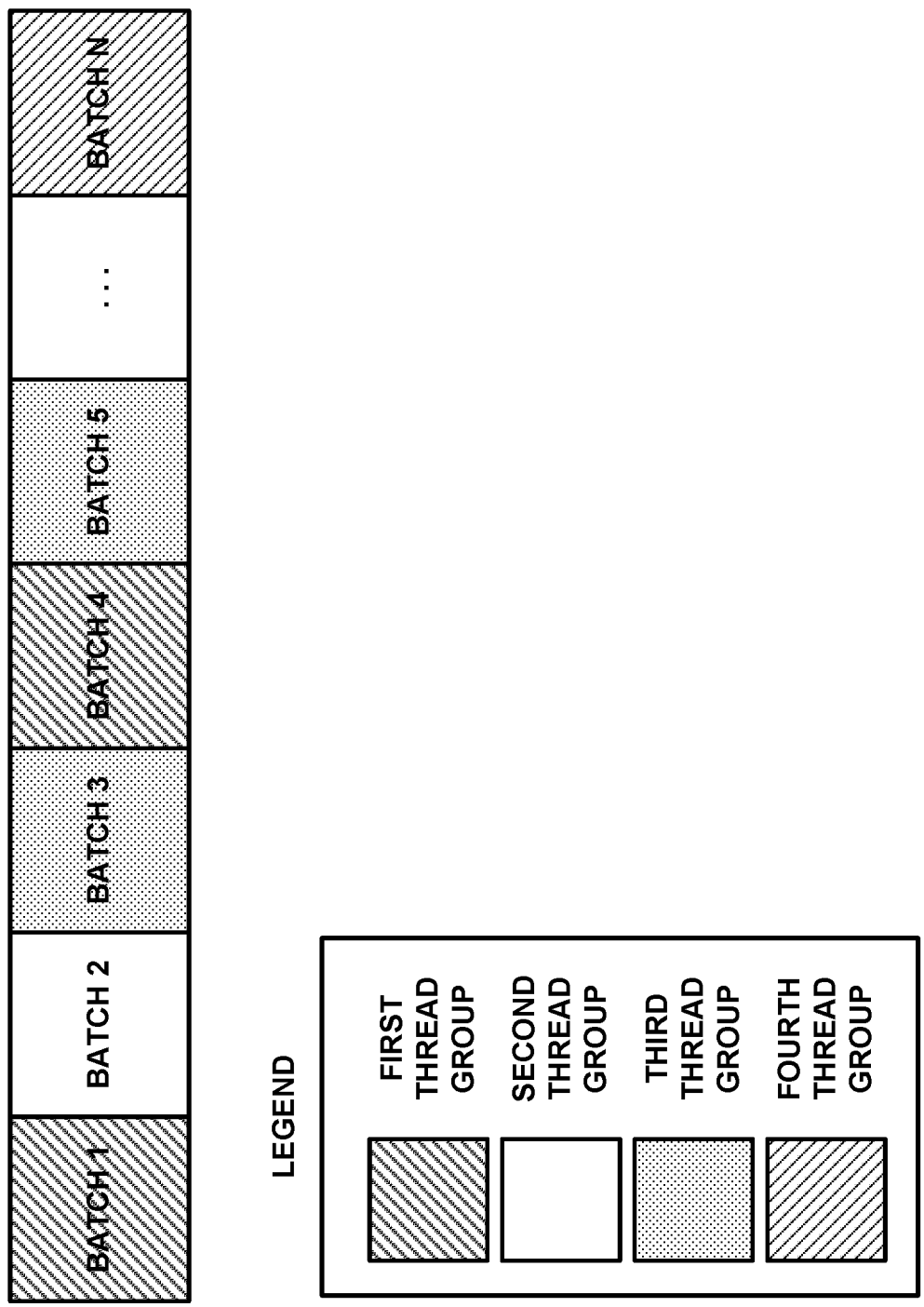
FIG. 8 illustrates an example of a conflict arbitration queue.

One or more batches of memory requests stored in conflict arbitration queue 40 may originate from one or more thread groups. For example, FIG. 8 illustrates an example in which conflict arbitration queue 40 is storing batches of memory requests (e.g., batch of memory requests 1 through N). In the example of FIG. 8, batches of memory requests 1 and 4 originate from a first thread group, batch of memory requests 2 originates form a second thread group, batches of memory requests 3 and 5 originate from a third thread group, and batch of requests N originates from a fourth thread group. While one or more batches of memory requests stored in conflict arbitration queue 40 may originate from one or more thread groups, arbiter 4 may not know which batches of memory requests correspond to which thread group until performing conflict arbitration.

Arbiter 4 may be configured to perform conflict arbitration to determine whether one or more conflicts (e.g., actual or potential conflicts) exist between two or more batches of memory requests originating from the same thread group. In this way, arbiter 4 may be configured to enable efficient and scalable out-of-order execution because rather than having a memory request stall at a memory controller, arbiter 4 may be configured to stall a memory request from being released from the conflict arbitration queue. While a particular memory request is stalled in conflict arbitration queue 40, arbiter 4 may be configured to release (e.g., send) one or more memory requests corresponding to a thread group different from the thread group corresponding to the stalled memory request. As another example, arbiter 4 may be configured to enable efficient and scalable out-of-order execution because rather than having a batch of memory requests stall at a memory controller, arbiter 4 may be configured to stall a batch of memory requests from being released from the conflict arbitration queue. While a particular batch of memory requests is stalled in conflict arbitration queue 40, arbiter 4 may be configured to release (e.g., send) one or more other batches of memory requests corresponding to a thread group different from the thread group corresponding to the stalled batch of memory requests. The thread group corresponding to a memory request or a batch of memory requests is the thread group from which the memory request or the batch of memory requests originated.

In some examples, conflict arbitration may include arbiter 4 being configured to determine the thread group from which a batch of memory requests stored in the conflict arbitration queue originates based on the metadata tagged to the batch of memory requests. In such examples, arbiter 4 may be configured to base such a determination on a thread group identifier included in the metadata.

FIG. 9 illustrates a simplified example of performing conflict arbitration in accordance with one or more techniques of this disclosure. The example of conflict arbitration queue 40 shown in FIG. 9 is a simplified example including three batches of memory request with each batch of memory requests including three memory requests. In the example of FIG. 9, the first batch of memory requests includes memory requests 1-B1, 2-B1, and 3-B1, the second batch of memory requests includes memory requests 1-B2, 2-B2, and 3-B2, and the third batch of memory requests includes memory requests 1-B3, 2-B3, and 3-B3. First metadata MD-B1 may be tagged to the first batch of memory requests, second metadata MD-B2 may be tagged to the second batch of memory requests, and third metadata MD-B3 may be tagged to the third batch of memory requests.

In the example of FIG. 9, the first and third batch of memory requests may originate from a first group of threads, and the second batch of memory requests may originate from a second group of threads. Arbiter 4 may be configured to determine the starting point of a batch of memory requests using the metadata tagged to the batch of memory requests. In some examples, first, second, and third metadata respectively tagged to the first, second, and third batches of memory requests may each include a batch start identifier. The batch start identifier identifies the beginning or start of a batch of memory requests.

In other examples, the first, second, and third metadata respectively tagged to the first, second, and third batches of memory requests may not include a batch start identifier. Instead, in such examples, arbiter 4 may be configured to determine the starting point of a batch of memory requests using a thread group identifier included in the metadata. For example, first, second, and third metadata respectively tagged to the first, second, and third batches of memory requests may each include a thread group identifier. The thread group identifier may identify the group of threads from which the first batch of memory requests originates. In the example of FIG. 9, the thread group identifier included in metadata MD-B1 and MD-B3 would be the same and the thread group identifier included in metadata MD-B2 would be different than the thread group identifier included in metadata MD-B1 and MD-B3.

The thread group identifier may be a unique identifier. The thread group identifier may identify the thread from which the batch of memory requests and/or memory requests originated. In some examples, the thread group may be mapped to a specific client (e.g., fixed function vertex fetch hardware) of processing unit 1.

An example is described to further explain what is meant by a temporarily unique identifier: A conflict arbitration queue may include multiple batches of memory requests, and among the multiple batches, the conflict arbitration queue may include a first plurality of batches of memory requests each tagged with a first thread group identifier to identify that each batch of memory requests of the first plurality of batches of memory requests originate from a first thread group. Processing unit 1 may be configured to reuse the first thread group identifier for one or more batches of memory requests originating from a thread group different from the first thread group upon determining that the conflict arbitration queue no longer includes any un-serviced (e.g., non-transmitted) memory requests corresponding to the first group identifier. For example, once arbiter 4 releases (e.g., sends) all memory requests corresponding to each batch of memory requests tagged with the first group identifier, processing unit 1 may be configured to tag one or more batches of memory requests originating from a second group of threads with the first thread group identifier, where the second group of threads is different from the first group of threads. In such examples, a ready-for-reuse flag may be associated with each thread group identifier. Arbiter 4 may be configured to set a ready-for-reuse flag to a value indicative that the thread group identifier corresponding thereto is ready for reuse. Processing unit 1 may be configured to determine the value corresponding to a ready-for-reuse flag, and reuse a thread group identifier when the corresponding ready-for-reuse flag is set.

It is understood that many examples herein are described with respect to the tagging methodology corresponding to FIGS. 4 and/or 5. However, it is understood that these examples are provided to illustrate various techniques of this disclosure; and, as such, the examples described with respect to the tagging methodology corresponding to FIG. 4 similarly apply to the tagging methodology corresponding to FIG. 5 and/or FIG. 6 with the understanding that the tagging methodology itself would be different. For example, immediately above, it is described in an example that once arbiter 4 releases (e.g., sends) all memory requests corresponding to each batch of memory requests tagged with the first group identifier, processing unit 1 may be configured to tag one or more batches of memory requests originating from a second group of threads with the first thread group identifier, where the second group of threads is different from the first group of threads. Consistent with this disclosure, it is therefore also understood in another example that once arbiter 4 releases (e.g., sends) all memory requests corresponding to each batch of memory requests including at least one tagged memory request with the first group identifier, processing unit 1 may be configured to tag one or more memory requests of a batch of memory requests originating from a second group of threads with the first thread group identifier, where the second group of threads is different from the first group of threads.

FIG. 10 illustrates a simplified example of performing conflict arbitration in accordance with one or more techniques of this disclosure. The metadata and batches of memory requests are the same as described with respect to FIG. 9. However, FIG. 10 illustrates that arbiter 4 may be configured to utilize one or more pointers. For example, arbiter 4 may utilize the one or more pointers to progress through memory requests in the queue. Each thread group may, in some examples, have two corresponding thread group-specific pointers: a first pointer and a second pointer. The first pointer may be referred to as a submit pointer and the second pointer may be referred to as a done pointer. A thread group-specific pointer is a pointer that is only used for a single thread group. For example, arbiter 4 may be configured to advance each pointer corresponding to a particular thread group such that each pointer corresponding to the particular thread group skips memory requests corresponding to a thread group different from the particular thread group. For example, while the pointers illustrated in FIG. 10 are described in more detail below, arbiter 4 may be configured to progress submit pointer 50A and done pointer 50B such that both of these pointers skip any memory requests that did not originate from the first thread group. Similarly, arbiter 4 may be configured to progress submit pointer 52A and done pointer 52B such that both of these pointers skip any memory requests that did not originate from the second thread group The example of FIG. 10 shows a snapshot in time of arbiter 4 progressing through conflict arbitration queue 40 using two pointers for each thread group.

In the example of FIG. 10, the first and third batch of memory requests may originate from a first group of threads, and the second batch of memory requests may originate from a second group of threads. Submit pointer 50A and done pointer 50B may correspond to the first group of threads, and submit pointer 52A and done pointer 52B may correspond to the second group of threads. A done pointer (e.g., done pointers 50B and 52B) may indicate (e.g., point to) the last memory request for which processing has finished or otherwise completed (e.g., by a memory controller) corresponding to the group of threads associated with the done pointer following release from conflict arbitration queue 40 by arbiter 4. In some examples, completion of a read memory request may refer to when data has been returned (e.g., returned to processing unit 1 or an upstream client different from processing unit 1) by a memory controller for a read memory request). In other examples, completion of a write memory request may refer to when data is consumed by a memory controller. Upon completion of a memory request, processing unit 1 may be configured to mark the memory request as done by advancing a done pointer to that memory request. In some examples, completion of memory requests may occur out of order at, for example, the memory controller. In such examples, the done pointer described herein may advance over a contiguous sequence of requests marked as done.

In some examples, there may be a single bit allocated to each memory request indicating if the corresponding memory request was released (e.g., sent downstream to a memory controller). Processing unit 1 may be configured advance a submit pointer if the submit pointer points to a memory request with such a bit being set (e.g., equaling a value of 1 or a value representative that the corresponding memory request was released). In this way (in this example), processing unit 1 may be configured to sequentially release memory requests from the conflict arbitration queue. For example, processing unit 1 may be configured to sequentially release memory requests on a per-batch basis by checking for batch delimiters in the conflict arbitration queue. In such an example, processing unit 1 may be configured to sequentially release memory requests of a batch from the conflict arbitration queue until the submit pointer reaches a batch delimiter (e.g., a batch start identifier).

Referring to the example of FIG. 10, done pointer 50B is pointing to memory request 3-B1 of the first batch of memory requests, and done pointer 52B is pointing to memory request 1-B2 of the second batch of memory requests. A submit pointer (e.g., submit pointers 50A and 52A) may indicate (e.g., point to) the current memory request corresponding to the group of threads associated with the submit pointer that arbiter 4 is scheduled to release from conflict arbitration queue 40 to, for example, a memory controller. For example, submit pointer 50A in the example of FIG. 10 is pointing to memory request 1-B3 of the third batch of memory requests, and submit pointer 52A is pointing to memory request 3-B2 of the second batch of memory requests.

Any memory request between a done pointer and a submit pointer has been cleared for release or actually released by arbiter 4 from conflict arbitration queue 40 for execution by, for example, a memory controller. For example, memory request 2-B2 may have been cleared for release or actually released by arbiter 4 from the conflict arbitration 40.

Arbiter may be configured to progress or otherwise move or advance the pointers corresponding to each thread group independently and in parallel of other pointers. For example, arbiter may be configured to progress submit pointer 50A and done pointer 50B independently and in parallel with submit pointer 52A and done pointer 52B.

In some examples, arbiter 4 may be configured to perform conflict arbitration to prevent intra-thread group conflicts. As used herein, a conflict may also be referred to as a hazard. Arbiter 4 may be configured to let a submit pointer for a particular thread group stay on a particular memory request, which may be referred to as a stalled memory request. In some examples, the stalled memory request and any subsequent memory requests stored in conflict arbitration queue 40 originating from the same thread group as the stalled memory request may not be released from the conflict arbitration queue by arbiter 4 until the done pointer points to the first memory request preceding the stalled memory request in the queue. For example in the example of FIG. 10, memory request 3-B1 may be the first memory request preceding memory request 1-B3.

In other examples, arbiter 4 may be configured to let a submit pointer for a particular thread group stay on a particular batch start identifier in examples where metadata tagged to batches of memory requests includes a batch start identifier, which may similarly serve to stall the release of any subsequent memory requests corresponding to the thread group with which the particular batch start identifier is associated. In such examples, the submit pointer may not progress forward in the queue until the done pointer points to the first memory request preceding the particular batch start identifier in the queue. For example in the example of FIG. 10, memory request 3-B1 may be the first memory request preceding a batch start identifier in metadata MD-B3. It is understood that submit pointer 50A would, in this example, stall on the batch start identifier in metadata MD-B3 instead of memory request 1-B3 as illustrated.

Arbiter 4 may be configured to identify and resolve a write-after-write conflict by serializing consecutive batches of write memory requests. Arbiter 4 may be configured to identify and resolve a read-after-write conflict by serializing a batch of write requests followed by a batch of read memory requests. Arbiter 4 may be configured to identify and resolve atomic memory access conflicts by serializing consecutive batches of atomic memory requests as well as serializing batches of atomic memory requests with any batch of non-atomic memory requests preceding a batch of atomic memory operations. FIGS. 11A-E illustrate various examples of how arbiter 4 may be configured to resolve possible or actual conflicts.

Each of FIGS. 11A-E illustrates batches of memory requests originating from a single thread group. Each block represents a batch of memory requests with the exception of a fence block, which is not a batch of memory requests but instead representative of a fence. For example, FIG. 11A includes two batches of read memory requests followed by two batches of write memory requests followed by a batch of read memory requests. It is understood that FIGS. 11A-G are conceptual in that these batches, if represented in conflict arbitration queue 40 would likely (but not necessarily) have at least one batch of memory requests originating from a different thread group stored between two depicted batches.

Figure 11A:
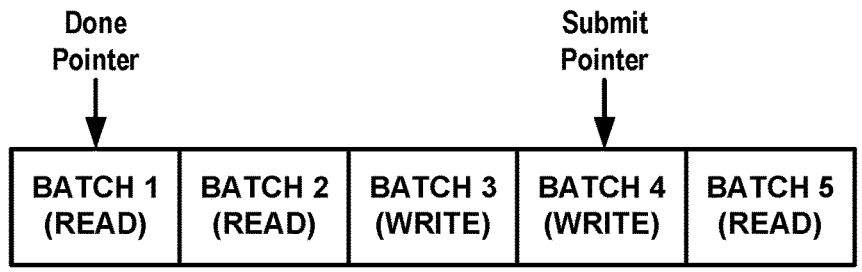
FIGS. 11A-E illustrate an example of performing conflict arbitration.

In the example of FIG. 11A, arbiter 4 may be configured to progress the submit pointer across sequential batches of read requests, and after the first batch of write requests (batch 3). However, arbiter 4 may be configured to determine that a write-after-write scenario may constitute an actual or potential conflict. Accordingly, arbiter 4 may be configured to stop (e.g., stall) the submit pointer at the second successive batch of write requests (batch 4).

Figure 11B:
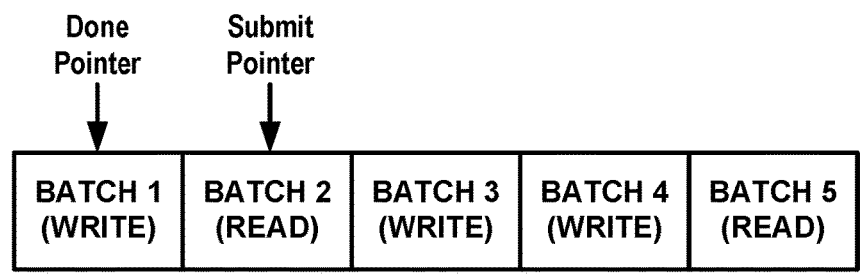

In the example of FIG. 11B, arbiter 4 may be configured to progress the submit pointer until the first read-after-write scenario. For example, arbiter 4 may be configured to determine that a read-after-write scenario may constitute an actual or potential conflict. Accordingly, arbiter 4 may be configured to stop (e.g., stall) the submit pointer at the batch of read requests (batch 2) following the batch of write requests (batch 1).

Figure 11C:
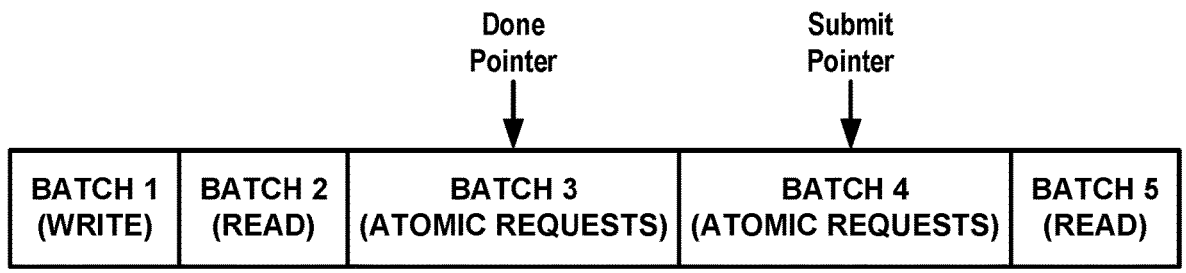

In the example of FIG. 11C, arbiter 4 may be configured to progress the submit pointer to batch 4 after resolving the read-after-write conflict between batches 1 and 2. For example, arbiter 4 may be configured to determine that successive batches of atomic memory requests may constitute an actual or potential conflict. Accordingly, arbiter 4 may be configured to stop (e.g., stall) the submit pointer at the second successive batch of atomic memory requests (batch 4) following the first batch of atomic memory requests (batch 3).

Figure 11D:
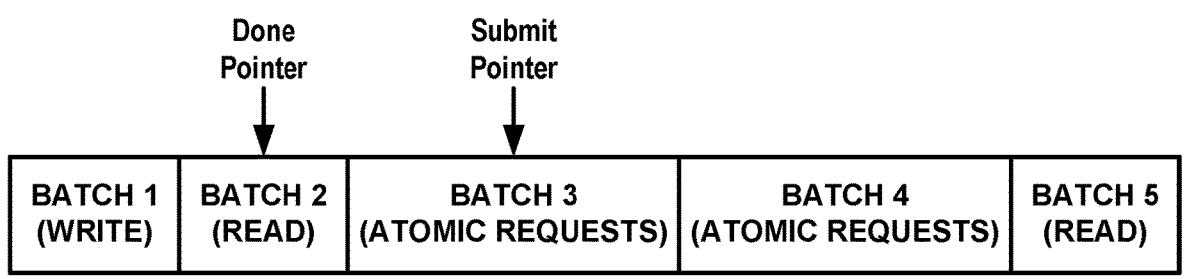

In the example of FIG. 11D, arbiter 4 may be configured to progress the submit pointer to batch 3 after resolving the read-after-write conflict between batches 1 and 2. For example, arbiter 4 may be configured to determine that atomic memory requests may constitute an actual or potential conflict with batches of non-atomic memory requests. Accordingly, arbiter 4 may be configured to stop (e.g., stall) the submit pointer at the first batch of atomic memory requests (batch 3) following the first preceding batch of non-atomic memory requests (batch 2).

Figure 11E:
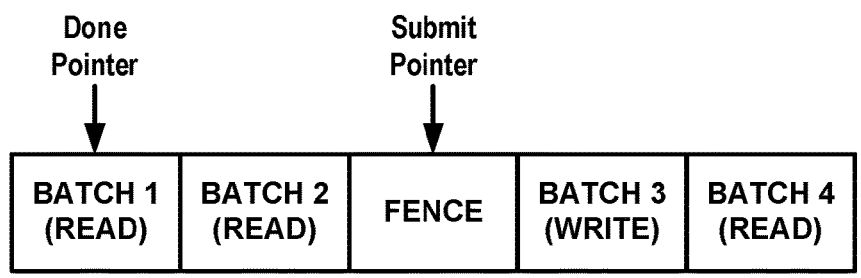

In the example of FIG. 11E, arbiter 4 may be configured to progress the submit pointer to batch to the fence until the done pointer catches up (e.g., when the done pointer reaches batch 2). In some examples, the fence may be a kernel-wide, a shader-wide fence, a workgroup fence, a subgroup fence, or any other fence or barrier. Arbiter 4 may be configured to order one or more batches of memory requests upon the done pointer reaching a fence. In some examples, a fence may stop one or more submit pointers corresponding to one or more thread groups. In such examples, the fence may also allow one or more submit pointers corresponding to one or more thread groups different from the one or more thread groups for which the fence stops the submit pointer to pass through the fence (e.g., the fence does not stop such submit pointers). In other examples, a fence may stop all submit pointers. By stopping the advancement of a submit pointer corresponding to a particular thread group, processing unit 1 is configured to stall execution of the next batch for that particular thread group until the batches and or memory requests corresponding to the fence have completed.

It is to be understood that reference to processing unit 1 and/or arbiter 4 being configured to perform any step, function, feature, method, and the like described herein may refer to, in some examples, processing unit 1 and/or arbiter 4 being configured to execute one or more instructions that cause the described step, function, feature, method and the like. In some examples, the one or more instructions may be stored on a memory accessible to processing unit 1 and/or arbiter 4. As an example, reference to processing unit 1 and/or arbiter 4 being configured to perform any step, function, feature, method, and the like described herein may refer to, in some examples, any compute device, compute unit, and/or processing element of processing unit 1 being configured to execute one or more instructions that cause the described step, function, feature, method and the like.

Figure 12:
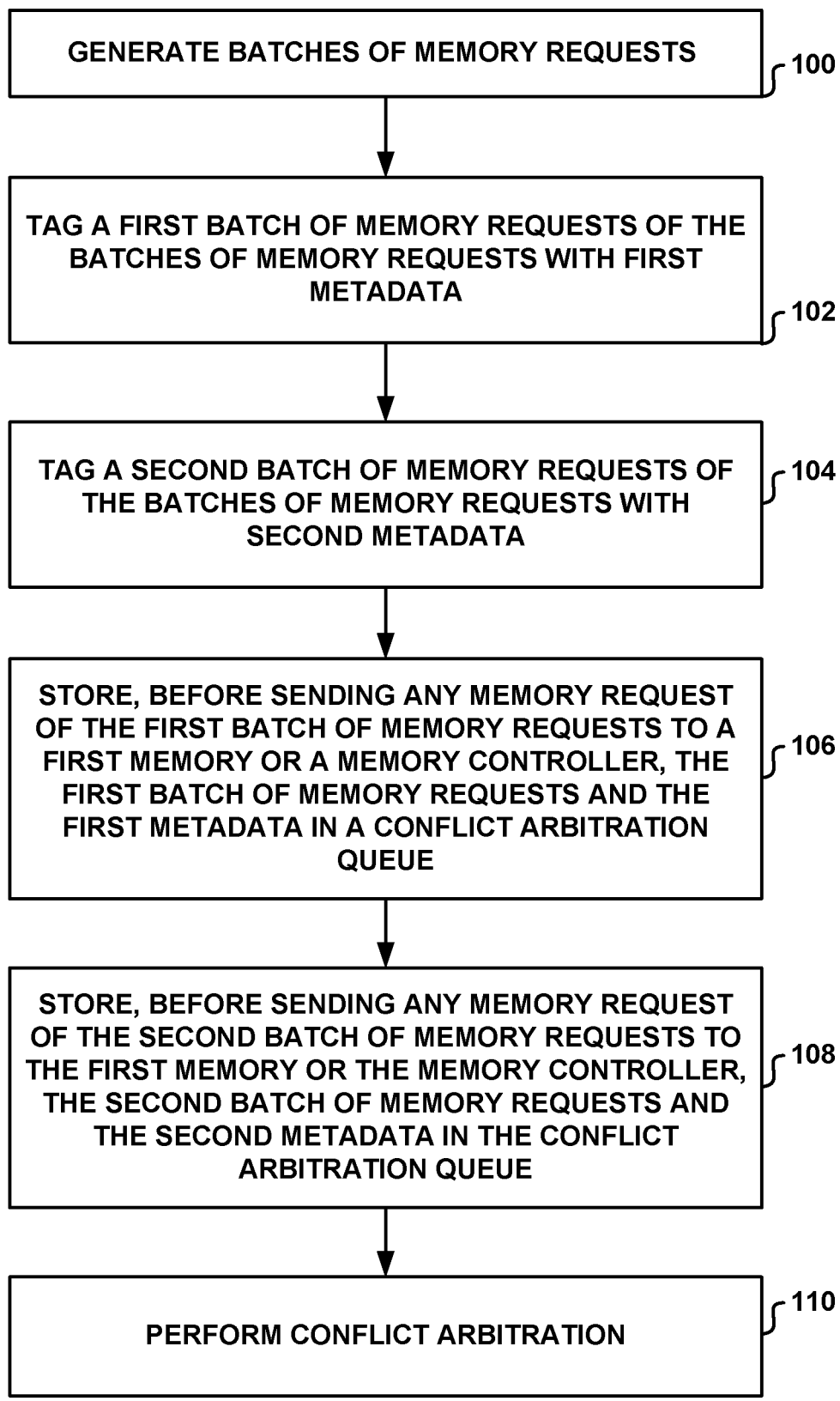
FIG. 12 illustrates an exemplary method according to one or more techniques of this disclosure.

FIG. 12 is a flowchart showing an example method of the disclosure. The method of FIG. 12 may be carried out by one or more processing units 1 (e.g., one or more CPUs, one or more GPUs, one or more parallel processing units (e.g., any processing unit configured to perform parallel processing), one or more SoCs, or any combinations thereof). FIG. 12 depicts one example method consistent with one or more techniques of this disclosure.

Processing unit 1 may be configured to generate batches of memory requests (100). Each batch of memory requests may respectively originate from execution of a respective group of threads. As one example, out of ten generated batches of memory requests, four of the ten batches of memory requests may originate from a first group of threads, two of the ten batches of memory requests may originate from a second group of threads, two of the ten batches of memory requests may originate from a third group of threads, one of the ten batches of memory requests may originate from a fourth group of threads, and one of the ten batches of memory requests may originate from a fifth group of threads. It is thus understood that each batch of memory requests respectively originating from execution of a respective group of threads means that a batch of threads originates from a single group of threads.

In some examples, processing unit 1 may be configured to generate a batch of memory requests by executing a group of threads. For example, each thread of a group of threads may be executed by a processing element of processing unit 1. Each thread of a group of threads may be executed in parallel by processing unit 1. For example, where the group of threads includes 32 threads, each of the 32 threads may be executed on a different processing element of processing unit 1 in parallel. In some examples, a processing element may be considered part of a compute unit of processing unit 1. Processing unit 1 may include a plurality of compute units with each compute unit including a plurality of processing elements.

Execution of a thread by a processing element may result in the generation of a memory request. In some examples, the processing element may be configured to tag the memory request with metadata and send the memory request tagged with the metadata to a conflict arbitration queue (e.g., conflict arbitration queue 40). In other examples, the processing element may be configured to tag the memory request with metadata and send the memory request tagged with the metadata to an arbiter (e.g., arbiter 4) of processing unit 1. In such examples, the arbiter may be configured to store the received memory request and metadata in a conflict arbitration queue (e.g., conflict arbitration queue 40). In other examples, the processing element may be configured to send the memory request to an arbiter (e.g., arbiter 4) of processing unit 1. In such examples, the arbiter may be configured to tag the received memory request with metadata and store the received memory request and metadata in a conflict arbitration queue (e.g., conflict arbitration queue 40). In other examples, processing unit 1 may be configured to execute multiple thread groups with each executing SIMD instructions. With multiple thread groups executing memory access SIMD instructions, processing unit 1 may be configured to select a thread group (e.g., through an arbitration process). Processing unit 1 may be configured to generate a set of memory requests from the threads of the selected thread group. In some examples, processing unit 1 may be configured to combine and coalesce the threads of the selected thread group to reduce their number. Processing unit 1 may be configured to execute the threads of the selected thread group (e.g., all threads or the reduced number resulting from combining and/or coalescing the threads), and the resulting set of memory requests may be tagged with a selected thread group ID (e.g., a thread group identifier for the selected thread group). The batch of memory requests may then be sent to, for example, arbiter 4 and/or a conflict arbitration queue (e.g., conflict arbitration queue 40) for arbitrating the batch of memory requests. The batch of memory requests may be delimited by, for example, a batch identifier, such as a batch start identifier described herein which may also be referred to as a batch delimiter token. The batch identifier may be stored in the conflict arbitration queue.

Processing unit 1 may be configured to tag a first batch of memory requests of the batches of memory requests with first metadata (102). The first metadata may include data identifying a group of threads from which the first batch of memory requests originates. The group of threads from which the first batch of memory requests originates may be a first group of threads. Processing unit 1 may be configured to tag a second batch of memory requests of the batches of memory requests with second metadata (104). The second metadata may include data identifying a group of threads from which the second batch of memory requests originates. The group of threads from which the second batch of memory requests originates may be the first group of threads. It is understood that processing unit 1 may be configured to tag batches of memory requests with metadata identifying the group of threads from which each batch of memory requests originates.

Processing unit 1 may be configured to store, before sending any memory request of the first batch of memory requests to a first memory or a memory controller, the first batch of memory requests and the first metadata in a conflict arbitration queue (106). Processing unit 1 may be configured to store, before sending any memory request of the second batch of memory requests to the first memory or the memory controller, the second batch of memory requests and the second metadata in the conflict arbitration queue (108). In some examples, the first memory may include any memory external to processing unit 1 (e.g., external memory 5A). In some examples, the memory controller may include any memory controller communicably coupled to the first memory (e.g., memory controller 5B in an example where the first memory is external memory 5A).

Processing unit 1 may be configured to perform conflict arbitration (110). For example, processing unit 1 may be configured to perform conflict arbitration using the first and the second metadata. As another example, processing unit 1 may be configured to perform, using the first metadata and the second metadata, conflict arbitration between only the first batch of memory of requests and the second batch of memory requests stored in the conflict arbitration queue. As used herein, reference to performing conflict arbitration between two batches of memory requests originating from the same group of threads refers to performing conflict arbitration between the two batches of memory requests without taking into account (e.g., ignoring or skipping) any other batch of memory requests stored in the conflict arbitration queue that originates from a group of threads different from the group of threads that the two batches of memory requests originate from. For example, as described above, processing unit 1 may be configured to perform, using the first metadata and the second metadata, conflict arbitration between only the first batch of memory of requests and the second batch of memory requests stored in the conflict arbitration queue. It is understood that this means performing conflict arbitration between the first and second batches of memory requests without taking into account (e.g., ignoring or skipping) any other batch of memory requests stored in the conflict arbitration queue that originates from a group of threads different from the group of threads that the first and second batches of memory requests originate from.

In such examples, the second batch of memory requests may be stored in the conflict arbitration queue after the first batch of memory requests. In some examples, at least one other batch of memory requests stored in the conflict arbitration queue originates from at least one group of threads different from the first group of threads. In such examples, the at least one other batch of memory requests stored in the conflict arbitration queue may be stored between the first batch of memory requests and the second batch of memory requests.

In some examples, processing unit 1 may be configured to perform conflict arbitration between only the first batch of memory of requests and the second batch of memory requests stored in the conflict arbitration queue by being configured to determine, using the first metadata, the first batch of memory requests originates from the first group of threads, and determine, using the second metadata, the second batch of memory requests originates from the first group of threads. For example, processing unit 1 may be configured to perform conflict arbitration between only the first batch of memory of requests and the second batch of memory requests stored in the conflict arbitration queue by being configured to determine that the data identifying the group of threads from which the first batch of memory requests originates and the data identifying the group of threads from which the second batch of memory requests originates matches. A match of such data indicates that the two batches of memory requests (e.g., the first and second batches of memory requests) originate from the same group of threads (the first thread group in this example).

In some examples, the data identifying the group of threads from which the first batch of memory requests originates is a first thread group identifier, and the data identifying the group of threads from which the second batch of memory requests originates is the first thread group identifier. In such examples, processing unit 1 may be configured to perform conflict arbitration between only the first batch of memory of requests and the second batch of memory requests stored in the conflict arbitration queue by being configured to determine that the thread group identifier tagged to the first batch of memory requests matches the thread group identifier tagged to the second batch of memory requests. A match of such data (e.g., the thread group identifier) between two batches indicates that the two batches of memory requests (e.g., the first and second batches of memory requests) originate from the same group of threads (the first thread group in this example).

In some examples, processing unit 1 may be configured to perform conflict arbitration between only the first batch of memory of requests and the second batch of memory requests stored in the conflict arbitration queue by being configured to determine whether or not there is a conflict between the first batch of memory requests and the second batch of memory requests to be resolved by processing unit 1. Processing unit 1 may be configured to determine whether or not there is a conflict between the first batch of memory requests and the second batch of memory requests to be resolved by processing unit 1 only if the first and second batches of memory requests originate from the same group of threads. Accordingly, processing unit 1 may be configured to determine whether or not there is a conflict between the first batch of memory requests and the second batch of memory requests to be resolved by processing unit 1 based on determining that the first and second batches of memory requests originate from the same group of threads (e.g., based on determining that the first and second batches of threads originate from the first thread group).

In some examples, processing unit 1 may be configured to send one or more memory requests of the first batch of memory requests to the first memory or the memory controller from the conflict arbitration queue before, during, and/or after performing conflict arbitration between only the first batch of memory requests and the second batch of memory requests stored in the conflict arbitration queue. For example, processing unit 1 may be configured to send all or less than all (e.g., one or more) memory requests of the first batch of memory requests to the first memory or the memory controller from the conflict arbitration queue before performing conflict arbitration between only the first batch of memory requests and the second batch of memory requests stored in the conflict arbitration queue. As another example, processing unit 1 may be configured to send all or less than all (e.g., one or more) memory requests of the first batch of memory requests to the first memory or the memory controller from the conflict arbitration queue during performing conflict arbitration between only the first batch of memory requests and the second batch of memory requests stored in the conflict arbitration queue. As another example, processing unit 1 may be configured to send all or less than all (e.g., one or more) memory requests of the first batch of memory requests to the first memory or the memory controller from the conflict arbitration queue after performing conflict arbitration between only the first batch of memory requests and the second batch of memory requests stored in the conflict arbitration queue.

As another example, processing unit 1 may be configured to send at least one memory request of the first batch of memory requests to the first memory or the memory controller from the conflict arbitration queue before, during, and after performing conflict arbitration between only the first batch of memory requests and the second batch of memory requests stored in the conflict arbitration queue. In such an example, it is understood that at least one memory request (e.g., a first memory request) is sent before performing conflict arbitration, at least one memory request (e.g., a second memory request) is sent during performing conflict arbitration, and at least one memory request (e.g., a third memory request) is sent after performing conflict arbitration. As another example, processing unit 1 may be configured to send at least one memory request of the first batch of memory requests to the first memory or the memory controller from the conflict arbitration queue during and after performing conflict arbitration between only the first batch of memory requests and the second batch of memory requests stored in the conflict arbitration queue. In such an example, it is understood that at least one memory request (e.g., a first memory request) is sent during performing conflict arbitration, and at least one memory request (e.g., a second memory request) is sent after performing conflict arbitration.

As used herein, the term conflict may refer to a conflict that processing unit 1 is configured to resolve. The term conflict may, in some examples, refer to an actual conflict or a potential conflict. For example, an actual conflict may correspond to the situation where changing the order of memory requests within a sequence would change the effect of the sequence on the set of memory locations that the sequence affects. In such an example, an actual conflict, if allowed to proceed (e.g., not suppressed by the techniques described herein), may result in different values stored in the set of memory locations than would otherwise be stored in the set of memory locations if the ordering of the memory requests is maintained. As another example, a potential conflict may correspond to the situation where changing the order of memory requests within a sequence may lead to an actual conflict, such as when a certain combination of parameters of participating memory requests (e.g., addresses specified by the memory requests) occurs. In some examples, processing unit 1 may, in accordance with the techniques described herein, suppress the reordering of memory requests upon determining there is a conflict between memory requests and/or batches of memory requests. For example, processing unit 1 may be configured to stall the release of one or more batches of memory requests and/or one or more memory requests corresponding to a particular thread group upon determining there is a conflict. During the stall, processing unit 1 may be configured to release one or more batches of memory requests and/or one or more memory requests corresponding to a different thread group upon determining there is no conflict.

In some examples, processing unit 1 may be configured to perform conflict arbitration between only the first batch of memory of requests and the second batch of memory requests stored in the conflict arbitration queue by being configured to send, upon determining there is not a conflict between the first batch of memory requests and the second batch of memory requests to be resolved by processing unit 1, the first batch of memory requests and the second batch of memory requests to the first memory or the memory controller from the conflict arbitration queue. For example, processing unit 1 may be configured to progress through the conflict arbitration queue by sending the memory requests of the first batch of memory requests, and sending, without stalling to ensure each memory request of the first batch of memory requests has executed, the second batch of memory requests.

In some examples, processing unit 1 may be configured to send memory requests originating from the same thread group in the order in which they are stored in the conflict arbitration queue (e.g., according to a First-In, First-Out Scheme relative to a thread group). As described herein, processing unit 1 may be configured to interrupt the sending of memory requests by stalling in the event of a conflict. In the event of a conflict, even though a stall may occur for batch of memory requests and even though memory requests from a different batch of memory requests originating from a group of threads different from the group of threads corresponding to the stalled batch of memory requests may be sent, processing unit 1 may be configured to continue the sending of memory requests originating from the same thread group in the order in which they are stored in the conflict arbitration queue (e.g., according to a First-In, First-Out Scheme relative to a thread group) upon lifting or otherwise removing the stall.

In some examples, processing unit 1 may be configured to perform conflict arbitration between only the first batch of memory of requests and the second batch of memory requests stored in the conflict arbitration queue by being configured to not stall sending, upon determining there is not a conflict between the first batch of memory requests and the second batch of memory requests to be resolved by processing unit 1, the second batch of memory requests to the first memory or the memory controller from the conflict arbitration queue until processing is completed for all the memory requests of the first batch of memory requests.

In some examples, processing unit 1 may be configured to perform conflict arbitration between only the first batch of memory of requests and the second batch of memory requests stored in the conflict arbitration queue by being configured to stall sending, upon determining there is a conflict between the first batch of memory requests and the second batch of memory requests to be resolved by processing unit 1, the second batch of memory requests to the first memory or the memory controller from the conflict arbitration queue until processing is completed for all the memory requests of the first batch of memory requests. Processing unit 1 may be configured to, as described above with respect to a number of examples, send one or more memory requests of the first batch of memory requests to the first memory or the memory controller from the conflict arbitration queue before, during, and/or after performing conflict arbitration between only the first batch of memory requests and the second batch of memory requests stored in the conflict arbitration queue. In some examples, processing unit 1 may be configured to send a third batch of memory requests originating from a second group of threads to the first memory or the memory controller after stalling the sending of the second batch of memory requests originating from the first group of threads and before sending the second batch of memory requests originating from the first group of threads to the first memory or the memory controller.

In some examples, processing unit 1 may be configured to determine whether or not there is a conflict between two batches of memory requests based on a batch type of each batch of memory requests. As used herein, the term batch type may refer to the type of memory requests a particular batch of memory requests includes. For example, a batch of read memory requests would have a batch type of read. As another example, a batch of write memory requests would have a batch type of write. Processing unit 1 may be configured to determine the batch type of a batch of memory requests. For example, processing unit 1 may be configured to determine the batch type of a batch of memory requests by determining the operation type corresponding to a thread from which a memory request is generated. As another example, processing unit 1 may be configured to determine the batch type of a batch of memory requests by determining the operation type corresponding to a SIMD instruction causing the generation of the memory request.

For example, processing unit 1 may be configured to determine whether or not there is a conflict between the first batch of memory requests and the second batch of memory requests to be resolved by processing unit 1 based on a batch type of the first batch of memory requests and a batch type of the second batch of memory requests. In such an example, processing unit 1 may be configured to determine there is a conflict between the first batch of memory requests and the second batch of memory requests to be resolved by processing unit 1 when a batch type of the first batch of memory requests is write and a batch type of the second batch of memory requests is write. As another example, processing unit 1 may be configured to determine there is a conflict between the first batch of memory requests and the second batch of memory requests to be resolved by processing unit 1 when a batch type of the first batch of memory requests is read and a batch type of the second batch of memory requests is read where the second batch of memory requests is positioned in the conflict arbitration queue after the first batch of memory requests.

It is understood that the first and second batches of memory requests described with respect to FIG. 12 are examples. As described above, processing unit 1 may be configured to tag batches of memory requests with metadata identifying the group of threads from which each batch of memory requests originates. The metadata may include data identifying the group of threads from which a particular batch of memory requests originates.

For example, processing unit 1 may be configured to tag a third batch of memory requests of the batches of memory requests with third metadata. The third metadata may include data identifying a group of threads from which the third batch of memory requests originates. The group of threads from which the third batch of memory requests originates may be the first group of threads. In this example, processing unit 1 may be configured to store, before sending any memory request of the third batch of memory requests to the first memory or the memory controller, the third batch of memory requests and the third metadata in the conflict arbitration queue. The second batch of memory requests may be stored in the conflict arbitration queue after the first batch of memory requests, and the third batch of memory may be stored in the conflict arbitration queue after the second batch of memory requests. Processing unit 1 may be configured to perform, using the second metadata and the third metadata, conflict arbitration between only the second batch of memory of requests and the third batch of memory requests stored in the conflict arbitration queue in a similar manner as described herein with respect to performing conflict arbitration between only the first batch of memory requests and the second batch of memory requests. In some examples, processing unit 1 may be configured to perform conflict arbitration between only the second batch of memory of requests and the third batch of memory requests stored in the conflict arbitration queue after performing conflict arbitration between only the first batch of memory of requests and the second batch of memory requests stored in the conflict arbitration queue. In other examples, processing unit 1 may be configured to perform, in parallel, conflict arbitration between only the second batch of memory of requests and the third batch of memory requests stored in the conflict arbitration queue, and conflict arbitration between only the first batch of memory of requests and the second batch of memory requests stored in the conflict arbitration queue.

In the example set forth in the previous paragraph, processing unit 1 may be configured to perform conflict arbitration between only the second batch of memory of requests and the third batch of memory requests stored in the conflict arbitration queue by being configured to determine, using the second metadata, the first batch of memory requests originates from the first group of threads, and determine, using the third metadata, the second batch of memory requests originates from the first group of threads. For example, processing unit 1 may be configured to perform conflict arbitration between only the second batch of memory of requests and the third batch of memory requests stored in the conflict arbitration queue by being configured to determine that the data identifying the group of threads from which the second batch of memory requests originates and the data identifying the group of threads from which the third batch of memory requests originates matches. A match of such data indicates that the two batches of memory requests (e.g., the second and third batches of memory requests) originate from the same group of threads (the first thread group in this example).

In some examples, the data identifying the group of threads from which the second batch of memory requests originates is the first thread group identifier as described above, and the data identifying the group of threads from which the third batch of memory requests originates is the first thread group identifier. In such examples, processing unit 1 may be configured to perform conflict arbitration between only the second batch of memory of requests and the third batch of memory requests stored in the conflict arbitration queue by being configured to determine that the thread group identifier tagged to the second batch of memory requests matches the thread group identifier tagged to the third batch of memory requests. A match of such data (e.g., the thread group identifier) between two batches indicates that the two batches of memory requests (e.g., the second and third batches of memory requests) originate from the same group of threads (the first thread group in this example).

In some examples, processing unit 1 may be configured to perform conflict arbitration between only the second batch of memory of requests and the third batch of memory requests stored in the conflict arbitration queue by being configured to determine whether or not there is a conflict between the second batch of memory requests and the third batch of memory requests to be resolved by processing unit 1. Processing unit 1 may be configured to determine whether or not there is a conflict between the second batch of memory requests and the third batch of memory requests to be resolved by processing unit 1 only if the second and third batches of memory requests originate from the same group of threads. Accordingly, processing unit 1 may be configured to determine whether or not there is a conflict between the second batch of memory requests and the third batch of memory requests to be resolved by processing unit 1 based on determining that the second and third batches of memory requests originate from the same group of threads (e.g., based on determining that the second and third batches of threads originate from the first thread group).

In some examples, processing unit 1 may be configured to send one or more memory requests of the second batch of memory requests to the first memory or the memory controller from the conflict arbitration queue before, during, and/or after performing conflict arbitration between only the second batch of memory requests and the third batch of memory requests stored in the conflict arbitration queue. For example, processing unit 1 may be configured to send all or less than all (e.g., one or more) memory requests of the second batch of memory requests to the first memory or the memory controller from the conflict arbitration queue before performing conflict arbitration between only the second batch of memory requests and the third batch of memory requests stored in the conflict arbitration queue. As another example, processing unit 1 may be configured to send all or less than all (e.g., one or more) memory requests of the second batch of memory requests to the first memory or the memory controller from the conflict arbitration queue during performing conflict arbitration between only the second batch of memory requests and the third batch of memory requests stored in the conflict arbitration queue. As another example, processing unit 1 may be configured to send all or less than all (e.g., one or more) memory requests of the second batch of memory requests to the first memory or the memory controller from the conflict arbitration queue after performing conflict arbitration between only the second batch of memory requests and the third batch of memory requests stored in the conflict arbitration queue.

As another example, processing unit 1 may be configured to send at least one memory request of the second batch of memory requests to the first memory or the memory controller from the conflict arbitration queue before, during, and after performing conflict arbitration between only the second batch of memory requests and the third batch of memory requests stored in the conflict arbitration queue. In such an example, it is understood that at least one memory request (e.g., a first memory request) is sent before performing conflict arbitration, at least one memory request (e.g., a second memory request) is sent during performing conflict arbitration, and at least one memory request (e.g., a third memory request) is sent after performing conflict arbitration. As another example, processing unit 1 may be configured to send at least one memory request of the second batch of memory requests to the first memory or the memory controller from the conflict arbitration queue during and after performing conflict arbitration between only the second batch of memory requests and the third batch of memory requests stored in the conflict arbitration queue. In such an example, it is understood that at least one memory request (e.g., a first memory request) is sent during performing conflict arbitration, and at least one memory request (e.g., a second memory request) is sent after performing conflict arbitration.

In some examples, processing unit 1 may be configured to perform conflict arbitration between only the second batch of memory of requests and the third batch of memory requests stored in the conflict arbitration queue by being configured to send, upon determining there is not a conflict between the second batch of memory requests and the third batch of memory requests to be resolved by processing unit 1, the second batch of memory requests and the third batch of memory requests to the first memory or the memory controller from the conflict arbitration queue. For example, processing unit 1 may be configured to progress through the conflict arbitration queue by sending the memory requests of the second batch of memory requests, and sending, without stalling to ensure each memory request of the second batch of memory requests has executed, the third batch of memory requests.

In some examples, processing unit 1 may be configured to perform conflict arbitration between only the second batch of memory of requests and the third batch of memory requests stored in the conflict arbitration queue by being configured to not stall sending, upon determining there is not a conflict between the second batch of memory requests and the third batch of memory requests to be resolved by processing unit 1, the third batch of memory requests to the first memory or the memory controller from the conflict arbitration queue until processing is completed for all the memory requests of the second batch of memory requests.

In some examples, processing unit 1 may be configured to perform conflict arbitration between only the second batch of memory of requests and the third batch of memory requests stored in the conflict arbitration queue by being configured to stall sending, upon determining there is a conflict between the second batch of memory requests and the third batch of memory requests to be resolved by processing unit 1, the third batch of memory requests to the first memory or the memory controller from the conflict arbitration queue until processing is completed for all the memory requests of the second batch of memory requests. Processing unit 1 may be configured to, as described above with respect to a number of examples, send one or more memory requests of the second batch of memory requests to the first memory or the memory controller from the conflict arbitration queue before, during, and/or after performing conflict arbitration between only the second batch of memory requests and the third batch of memory requests stored in the conflict arbitration queue. In some examples, processing unit 1 may be configured to send a fourth batch of memory requests originating from a second group of threads to the first memory or the memory controller after stalling the sending of the third batch of memory requests originating from the first group of threads and before sending the third batch of memory requests originating from the first group of threads to the first memory or the memory controller.

For example, processing unit 1 may be configured to determine whether or not there is a conflict between the second batch of memory requests and the third batch of memory requests to be resolved by processing unit 1 based on a batch type of the second batch of memory requests and a batch type of the third batch of memory requests. In such an example, processing unit 1 may be configured to determine there is a conflict between the second batch of memory requests and the third batch of memory requests to be resolved by processing unit 1 when a batch type of the second batch of memory requests is write and a batch type of the third batch of memory requests is write. As another example, processing unit 1 may be configured to determine there is a conflict between the second batch of memory requests and the third batch of memory requests to be resolved by processing unit 1 when a batch type of the second batch of memory requests is read and a batch type of the third batch of memory requests is read where the second batch of memory requests is positioned in the conflict arbitration queue after the first batch of memory requests.

In other examples, the group of threads from which the third batch of memory requests originates may not be the first group of threads. It is understood that preceding paragraphs [0118]-[0127] do not apply to the examples described below where the third batch of memory requests does not originate from the first group of threads. In examples where the third batch of memory requests does not originate from the first group of threads, the group of threads from which the third batch of memory requests originates may be a second group of threads. In such examples, the third metadata may include data identifying a group of threads from which the third batch of memory requests originates.

Processing unit 1 may be configured to tag a fourth batch of memory requests of the batches of memory requests with fourth metadata. The fourth metadata may include data identifying a group of threads from which the fourth batch of memory requests originates. The group of threads from which the fourth batch of memory requests originates may be the second group of threads. Processing unit 1 may be configured to store, before sending any memory request of the third batch of memory requests to the first memory or the memory controller, the third batch of memory requests and the third metadata in the conflict arbitration queue. Processing unit 1 may be configured to store, before sending any memory request of the fourth batch of memory requests to the first memory or the memory controller, the fourth batch of memory requests and the fourth metadata in the conflict arbitration queue.

In some examples, the fourth batch of memory requests may be stored in the conflict arbitration queue after the third batch of memory requests. For example, the third batch of memory requests and/or the fourth batch of memory requests may be stored in the conflict arbitration queue between the first and second batches of memory requests. As another example, the third batch of memory requests may be stored in the conflict arbitration queue between the first and second batches of memory requests and the fourth batch of memory requests may be stored in the conflict arbitration queue after the first and second batches of memory requests. As another example, the fourth batch of memory requests may be stored in the conflict arbitration queue between the first and second batches of memory requests and the third batch of memory requests may be stored in the conflict arbitration queue after the first and second batches of memory requests.

In examples where the third batch of memory requests and the fourth batch of memory requests are stored in the conflict arbitration queue between the first and second batches of memory requests, processing unit 1 may be configured to perform, using the third metadata and the fourth metadata, conflict arbitration between only the first batch of memory of requests and the second batch of memory requests stored in the conflict arbitration queue. Processing unit 1 may be configured to perform, using the third metadata and the fourth metadata, conflict arbitration between only the first batch of memory of requests and the second batch of memory requests stored in the conflict arbitration queue by being configured to determine, using the third metadata, the third batch of memory requests does not originate from the first group of threads, and determine, using the fourth metadata, the fourth batch of memory requests does not originate from the first group of threads.

In examples where the third batch of memory requests is stored in the conflict arbitration queue between the first and second batches of memory requests and the fourth batch of memory requests is stored in the conflict arbitration queue after the first and second batches of memory requests, processing unit 1 may be configured to perform, using the third metadata, conflict arbitration between only the first batch of memory of requests and the second batch of memory requests stored in the conflict arbitration queue. Processing unit 1 may be configured to perform, using the third metadata, conflict arbitration between only the first batch of memory of requests and the second batch of memory requests stored in the conflict arbitration queue by being configured to determine, using the third metadata, the third batch of memory requests does not originate from the first group of threads.

In examples where the fourth batch of memory requests is stored in the conflict arbitration queue between the first and second batches of memory requests and the third batch of memory requests is stored in the conflict arbitration queue after the first and second batches of memory requests, processing unit 1 may be configured to perform, using the fourth metadata, conflict arbitration between only the first batch of memory of requests and the second batch of memory requests stored in the conflict arbitration queue. Processing unit 1 may be configured to perform, using the fourth metadata, conflict arbitration between only the first batch of memory of requests and the second batch of memory requests stored in the conflict arbitration queue by being configured to determine, using the fourth metadata, the fourth batch of memory requests does not originate from the first group of threads.

Processing unit 1 may be configured to determine the third batch of memory requests does not originate from the first group of threads by being configured to determine the third batch of memory requests originates from the second group of threads. Similarly, processing unit 1 may be configured to determine the fourth batch of memory requests does not originate from the first group of threads by being configured to determine the fourth batch of memory requests originates from the second group of threads.

Processing unit 1 may be configured to perform conflict arbitration between only the third batch of memory of requests and the fourth batch of memory requests stored in the conflict arbitration queue in parallel with performing conflict arbitration between only the first batch of memory requests and the second batch of memory requests stored in the conflict arbitration queue. Processing unit 1 may be configured to perform conflict arbitration between only the third batch of memory of requests and the fourth batch of memory requests stored in the conflict arbitration queue in a similar manner as described herein with respect to performing conflict arbitration between only the first batch of memory requests and the second batch of memory requests.

Processing unit 1 may be configured to perform one or more techniques described in this disclosure. For example, it is understood that processing unit 1 may be configured to perform any technique described with respect to arbiter 4, whether by or without arbiter 4. In some examples, arbiter 4 is a conceptual functional unit of processing unit 1. In such examples, it is understood that reference to arbiter 4 includes reference to processing unit 1 because processing unit 1 provides the functionality of arbiter 4. In other examples, arbiter 4 is a physical unit of processing unit 1. In such examples, arbiter 4 may be or include one or more of the following elements of processing unit 1: processors (e.g., one or more microprocessors), one or more application specific integrated circuits (ASICs), one or more field programmable gate arrays (FPGAs), one or more arithmetic logic units (ALUs), one or more digital signal processors (DSPs), discrete logic, software, hardware, firmware, or other equivalent integrated or discrete logic circuitry. Similarly, arbiter 4 may be configured to perform one or more techniques described in this disclosure. For example, arbiter 4 may be configured to perform one or more techniques described herein with respect to processing unit 1. As an example, some examples herein describe processing unit 1 as being configured to tag batches of memory requests, store batches of memory requests and metadata in a conflict arbitration queue, and perform conflict arbitration. In such examples, it is understood that arbiter 4 may be configured to perform such features.

In accordance with this disclosure, the term "or" may be interrupted as "and/or" where context does not dictate otherwise. Additionally, while phrases such as "one or more" or "at least one" or the like may have been used for some features disclosed herein but not others; the features for which such language was not used may be interpreted to have such a meaning implied where context does not dictate otherwise.

While particular combinations of various aspects of the techniques are described above, these combinations are provided merely to illustrate examples of the techniques described in this disclosure. Accordingly, the techniques of this disclosure should not be limited to these example combinations and may encompass any conceivable combination of the various aspects of the techniques described in this disclosure.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be stored, embodied or encoded in a computer-readable medium, such as a computer-readable storage medium that stores instructions. Instructions embedded or encoded in a computer-readable medium may cause one or more processors to perform the techniques described herein, e.g., when the instructions are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Computer-readable media may include computer-readable storage media, which corresponds to a tangible storage medium, such as those listed above. Computer-readable media may also comprise communication media including any medium that facilitates transfer of a computer program from one place to another, e.g., according to a communication protocol. In this manner, the phrase "computer-readable media" generally may correspond to (1) tangible computer-readable storage media which is non-transitory, and (2) a non-tangible computer-readable communication medium such as a transitory signal or carrier wave.

Various aspects and examples have been described. However, modifications can be made to the structure or techniques of this disclosure without departing from the scope of the following claims.

What is claimed is:
1. A method comprising:
   generating, by a processing unit, batches of memory requests, wherein each batch of memory requests respectively originates from execution of a respective group of threads;

tagging, by the processing unit, a first batch of memory requests of the batches of memory requests with first metadata, wherein the first metadata includes data identifying a group of threads from which the first batch of memory requests originates, wherein the group of threads from which the first batch of memory requests originates is a first group of threads;

tagging, by the processing unit, a second batch of memory requests of the batches of memory requests with second metadata, wherein the second metadata includes data identifying a group of threads from which the second batch of memory requests originates, wherein the group of threads from which the second batch of memory requests originates is the first group of threads;

storing, by the processing unit, before sending any memory request of the first batch of memory requests to a first memory or a memory controller, the first batch of memory requests and the first metadata in a conflict arbitration queue;

storing, by the processing unit, before sending any memory request of the second batch of memory requests to the first memory or the memory controller, the second batch of memory requests and the second metadata in the conflict arbitration queue; and performing, by the processing unit, using the first metadata and the second metadata, conflict arbitration between only the first batch of memory requests and the second batch of memory requests stored in the conflict arbitration queue, wherein at least one other batch of memory requests stored in the conflict arbitration queue originates from at least one group of threads different from the first group of threads, wherein performing conflict arbitration comprises:

determining there is not a conflict between the first batch of memory requests and the second batch of memory requests in response to determining that reordering an order of memory requests specified by the first batch of memory requests and the second batch of memory requests does not result in different values stored in the first memory or the memory controller than would be stored in the first memory or the memory controller if the ordering of the memory requests is maintained, and sending the second batch of memory requests to the first memory or the memory controller from the conflict arbitration queue upon determining there is not a conflict between the first batch of memory requests and the second batch of memory requests to be resolved by the processing unit and without taking into account the at least one other batch of memory requests stored in the conflict arbitration queue that originates from the at least one group of threads different from the first group of threads.

2. The method of claim 1, wherein the at least one other batch of memory requests stored in the conflict arbitration queue is stored between the first batch of memory requests and the second batch of memory requests.

3. The method of claim 1, wherein performing conflict arbitration between only the first batch of memory requests and the second batch of memory requests stored in the conflict arbitration queue includes:

determining, using the first metadata, the first batch of memory requests originates from the first group of threads; and determining, using the second metadata, the second batch of memory requests originates from the first group of threads.

4. The method of claim 1, wherein the data identifying the group of threads from which the first batch of memory requests originates is a first thread group identifier, and wherein the data identifying the group of threads from which the second batch of memory requests originates is the first thread group identifier.

5. The method of claim 1, further comprising:

tagging, by the processing unit, a third batch of memory requests of the batches of memory requests with third metadata, wherein the third metadata includes data identifying a group of threads from which the third batch of memory requests originates, wherein the group of threads from which the third batch of memory requests originates is a second group of threads;

tagging, by the processing unit, a fourth batch of memory requests of the batches of memory requests with fourth metadata, wherein the fourth metadata includes data identifying a group of threads from which the fourth batch of memory requests originates, wherein the group of threads from which the fourth batch of memory requests originates is the second group of threads;

storing, before sending any memory request of the third batch of memory requests to the first memory or the memory controller, the third batch of memory requests and the third metadata in the conflict arbitration queue;

storing, before sending any memory request of the fourth batch of memory requests to the first memory or the memory controller, the fourth batch of memory requests and the fourth metadata in the conflict arbitration queue; and performing, using at least one of the third metadata or the fourth metadata, conflict arbitration between only the first batch of memory requests and the second batch of memory requests stored in the conflict arbitration queue.

6. The method of claim 5, wherein performing conflict arbitration between only the first batch of memory requests and the second batch of memory requests stored in the conflict arbitration queue includes:

determining, using the first metadata, the first batch of memory requests originates from the first group of threads;

determining, using the second metadata, the second batch of memory requests originates from the first group of threads; and performing at least one of:

determining, using the third metadata, the third batch of memory requests does not originate from the first group of threads; or determining, using the fourth metadata, the fourth batch of memory requests does not originate from the first group of threads.

7. The method of claim 6, wherein determining the third batch of memory requests does not originate from the first group of threads includes determining the third batch of memory requests originates from the second group of threads, or wherein determining the fourth batch of memory requests does not originate from the first group of threads includes determining the fourth batch of memory requests originates from the second group of threads.

8. The method of claim 5, wherein the data identifying the group of threads from which the first batch of memory requests originates is a first thread group identifier, wherein the data identifying the group of threads from which the second batch of memory requests originates is the first thread group identifier, wherein the data identifying the group of threads from which the third batch of memory requests originates is a second thread group identifier, and wherein the data identifying the group of threads from which the fourth batch of memory requests originates is the second thread group identifier.

9. The method of claim 5, further comprising performing conflict arbitration between only the third batch of memory requests and the fourth batch of memory requests stored in the conflict arbitration queue in parallel with performing conflict arbitration between only the first batch of memory requests and the second batch of memory requests stored in the conflict arbitration queue.

10. The method of claim 1, wherein the conflict is an actual or potential conflict.

11. The method of claim 1, wherein performing conflict arbitration between only the first batch of memory requests and the second batch of memory requests stored in the conflict arbitration queue includes:
sending, upon determining there is not a conflict between the first batch of memory requests and the second batch of memory requests to be resolved by the processing unit, the first batch of memory requests to the first memory or the memory controller from the conflict arbitration queue.

12. The method of claim 1, wherein performing conflict arbitration between only the first batch of memory requests and the second batch of memory requests stored in the conflict arbitration queue includes:
not stalling sending, upon determining there is not a conflict between the first batch of memory requests and the second batch of memory requests to be resolved by the processing unit, the second batch of memory requests to the first memory or the memory controller from the conflict arbitration queue until processing is completed for all the memory requests of the first batch of memory requests.

13. The method of claim 1, further comprising:
sending one or more memory requests of the first batch of memory requests to the first memory or the memory controller from the conflict arbitration queue before, during, or after performing conflict arbitration between only the first batch of memory requests and the second batch of memory requests stored in the conflict arbitration queue.

14. The method of claim 1, wherein performing conflict arbitration between only the first batch of memory requests and the second batch of memory requests stored in the conflict arbitration queue includes:
stalling sending, upon determining there is a conflict between the first batch of memory requests and the second batch of memory requests to be resolved by the processing unit, the second batch of memory requests to the first memory or the memory controller from the conflict arbitration queue until processing is completed for all the memory requests of the first batch of memory requests.

15. The method of claim 14, further comprising:
sending one or more memory requests of the first batch of memory requests to the first memory or the memory controller from the conflict arbitration queue before, during, or after performing conflict arbitration between only the first batch of memory requests and the second batch of memory requests stored in the conflict arbitration queue.

16. The method of claim 1, further comprising:
determining there is not a conflict between the first batch of memory requests and the second batch of memory requests to be resolved by the processing unit when a batch type of the first batch of memory requests is read and a batch type of the second batch of memory requests is not read, wherein the second batch of memory requests is positioned in the conflict arbitration queue after the first batch of memory requests.

17. The method of claim 16, further comprising:
sending a third batch of memory requests originating from a second group of threads to the first memory or the memory controller after stalling the sending of the second batch of memory requests originating from the first group of threads and before sending the second batch of memory requests originating from the first group of threads to the first memory or the memory controller.

18. The method of claim 1, further comprising:
tagging, by the processing unit, a third batch of memory requests of the batches of memory requests with third metadata, wherein the third metadata includes data identifying a group of threads from which the third batch of memory requests originates, wherein the group of threads from which the third batch of memory requests originates is the first group of threads;
storing, before sending any memory request of the third batch of memory requests to the first memory or the memory controller, the third batch of memory requests and the third metadata in the conflict arbitration queue;
performing, using the second metadata and the third metadata, conflict arbitration between only the second batch of memory requests and the third batch of memory requests stored in the conflict arbitration queue.

19. The method of claim 18, further comprising:
performing conflict arbitration between only the second batch of memory requests and the third batch of memory requests stored in the conflict arbitration queue after performing conflict arbitration between only the first batch of memory requests and the second batch of memory requests stored in the conflict arbitration queue.

20. The method of claim 18, wherein performing conflict arbitration between only the second batch of memory requests and the third batch of memory requests stored in the conflict arbitration queue includes:
determining, using the second metadata, the first batch of memory requests originates from the first group of threads; and
determining, using the third metadata, the second batch of memory requests originates from the first group of threads, wherein the first, second, and third metadata includes a first thread group identifier, wherein the data identifying the group of threads from which the first batch of memory requests originates is a first thread group identifier, wherein the data identifying the group of threads from which the second batch of memory requests originates is the first thread group identifier, and wherein the data identifying the group of threads from which the third batch of memory requests originates is the first thread group identifier.

21. The method of claim 20, wherein performing conflict arbitration between only the second batch of memory requests and the third batch of memory requests stored in the conflict arbitration queue includes:
determining whether or not there is a conflict between the second batch of memory requests and the third batch of memory requests to be resolved by the processing unit.

22. The method of claim 1, wherein the processing unit is a graphics processing unit (GPU).

23. A device comprising:
a first memory;
a memory controller communicably coupled to the first memory; and
a processing unit communicably coupled to at least one of the first memory or the memory controller, wherein the processing unit is configured to:
  generate batches of memory requests, wherein each batch of memory requests respectively originates from execution of a respective group of threads;
  tag a first batch of memory requests of the batches of memory requests with first metadata, wherein the first metadata includes data identifying a group of threads from which the first batch of memory requests originates, wherein the group of threads from which the first batch of memory requests originates is a first group of threads;
  tag a second batch of memory requests of the batches of memory requests with second metadata, wherein the second metadata includes data identifying a group of threads from which the second batch of memory requests originates, wherein the group of threads from which the second batch of memory requests originates is the first group of threads;
  store, before sending any memory request of the first batch of memory requests to the first memory or the memory controller, the first batch of memory requests and the first metadata in a conflict arbitration queue;
  store, before sending any memory request of the second batch of memory requests to the first memory or the memory controller, the second batch of memory requests and the second metadata in the conflict arbitration queue; and
  performing, using the first metadata and the second metadata, conflict arbitration between only the first batch of memory requests and the second batch of memory requests stored in the conflict arbitration queue, wherein at least one other batch of memory requests stored in the conflict arbitration queue originates from at least one group of threads different from the first group of threads, wherein, to perform conflict arbitration, the processing unit is configured to:
    determine there is not a conflict between the first batch of memory requests and the second batch of memory requests in response to determining that reordering an order of memory requests specified by the first batch of memory requests and the second batch of memory requests does not result in different values stored in the first memory or the memory controller than would be stored in the first memory or the memory controller if the ordering of the memory requests is maintained, and
    send the second batch of memory requests to the first memory or the memory controller from the conflict arbitration queue upon determining there is not a conflict between the first batch of memory requests and the second batch of memory requests to be resolved by the processing unit and without taking into account the at least one other batch of memory requests stored in the conflict arbitration queue that originates from the at least one group of threads different from the first group of threads.

24. The device of claim 23, wherein the conflict arbitration queue is allocated in a second memory.

25. The device of claim 24, wherein the second memory is internal to the processing unit or is external to the processing unit.

26. A non-transitory computer-readable storage medium having storing instructions thereon that, when executed, cause one or more processing units to:
  generate batches of memory requests, wherein each batch of memory requests respectively originates from execution of a respective group of threads;
  tag a first batch of memory requests of the batches of memory requests with first metadata, wherein the first metadata includes data identifying a group of threads from which the first batch of memory requests originates, wherein the group of threads from which the first batch of memory requests originates is a first group of threads;
  tag a second batch of memory requests of the batches of memory requests with second metadata, wherein the second metadata includes data identifying a group of threads from which the second batch of memory requests originates, wherein the group of threads from which the second batch of memory requests originates is the first group of threads;
  store, before sending any memory request of the first batch of memory requests to a first memory or a memory controller, the first batch of memory requests and the first metadata in a conflict arbitration queue;
  store, before sending any memory request of the second batch of memory requests to the first memory or the memory controller, the second batch of memory requests and the second metadata in the conflict arbitration queue; and
  perform, using the first metadata and the second metadata, conflict arbitration between only the first batch of memory requests and the second batch of memory requests stored in the conflict arbitration queue, wherein at least one other batch of memory requests stored in the conflict arbitration queue originates from at least one group of threads different from the first group of threads, wherein, to perform conflict arbitration, the one or more processing units are caused to:
    determine there is not a conflict between the first batch of memory requests and the second batch of memory requests in response to determining that reordering an order of memory requests specified by the first batch of memory requests and the second batch of memory requests does not result in different values stored in the first memory or the memory controller than would be stored in the first memory or the memory controller if the ordering of the memory requests is maintained, and
    send the second batch of memory requests to the first memory or the memory controller from the conflict arbitration queue upon determining there is not a conflict between the first batch of memory requests and the second batch of memory requests to be resolved by the processing unit and without taking into account the at least one other batch of memory requests stored in the conflict arbitration queue that originates from the at least one group of threads different from the first group of threads.

* * * * *